United States Patent
Akagi et al.

(10) Patent No.: US 8,580,459 B2
(45) Date of Patent: Nov. 12, 2013

(54) FUEL CELL WITH FLOW CHANNEL MEMBER FOR SUPPLYING REACTIVE GAS

(75) Inventors: Yousuke Akagi, Fukuoka (JP); Naoki Watanabe, Fukuoka (JP); Shuichiro Saigan, Fukuoka (JP); Nobuo Isaka, Fukuoka (JP)

(73) Assignee: Toto Ltd., Fukuoka (JP)

( * ) Notice: Subject to any disclaimer, the term of this patent is extended or adjusted under 35 U.S.C. 154(b) by 409 days.

(21) Appl. No.: 12/833,532

(22) Filed: Jul. 9, 2010

(65) Prior Publication Data

US 2011/0008701 A1 Jan. 13, 2011

(30) Foreign Application Priority Data

Jul. 10, 2009 (JP) .................. 2009-163543

(51) Int. Cl.
*H01M 2/38* (2006.01)
*H01M 2/40* (2006.01)
*H01M 8/04* (2006.01)
*H01M 8/10* (2006.01)
*H01M 8/24* (2006.01)

(52) U.S. Cl.
USPC ........... 429/513; 429/443; 429/444; 429/452; 429/455; 429/459; 429/465; 429/466

(58) Field of Classification Search
USPC ......... 429/455, 443, 444, 452, 459, 465, 466, 429/513
See application file for complete search history.

(56) References Cited

U.S. PATENT DOCUMENTS 5,336,569 A 8/1994 Misawa et al.

FOREIGN PATENT DOCUMENTS

| DE | 195 17 425 C1 | 10/1996 |
| EP | 0 410 796 A1 | 1/1991 |
| EP | 0 505 184 A1 | 9/1992 |
| EP | 1 327 835 A2 | 7/2003 |
| EP | 2023431 A1 * | 2/2009 |
| JP | H04-237963 A | 8/1992 |
| JP | H04-294068 A | 10/1992 |
| JP | 2007-179884 A | 7/2007 |
| JP | 2008-034205 A | 2/2008 |
| JP | 2008-300276 A | 12/2008 |
| WO | 99/54951 A1 | 10/1999 |

OTHER PUBLICATIONS

The Extended European Search Report dated Oct. 21, 2010; Application No. 10251226.6-2119.

* cited by examiner

*Primary Examiner* — Sean P. Cullen
(74) *Attorney, Agent, or Firm* — Studebaker & Brackett PC

(57) ABSTRACT

A fuel cell includes plural single cells and first sidewalls disposed on the outer side of a cell stack including the plural single cells. In the first sidewalls, holes for supplying the reactive gas to the cell stack are formed. The single cells are disposed in a row shape along a jetting direction (lateral direction) of the reactive gas jetted from the holes. The holes are formed such that a part of the reactive gas jetted from the holes brushes against at least the single cells disposed in positions closest to the first sidewalls and the remaining part of the reactive gas does not brush against the single cells disposed in the closest positions.

8 Claims, 10 Drawing Sheets

FUEL CELL WITH FLOW CHANNEL MEMBER FOR SUPPLYING REACTIVE GAS

CROSS-REFERENCE TO RELATED APPLICATION

This application claims benefit under 35 U.S.C. §119(a) of Japanese Patent Application No. 2009-163543, filed on Jul. 31, 2009, in the Japan Patent Office, the entire contents of which are incorporated herein by reference.

BACKGROUND OF THE INVENTION

1. Field of the Invention

The present invention relates to a fuel cell including plural single cells that operate with a reactive gas.

2. Description of the Related Art

Conventionally, as a type of a fuel cell, there is a solid-oxide fuel cell (hereinafter also referred to as "SOFC") including plural single cells that operate with a reactive gas. This SOFC can cause power generation reaction by supplying a hydrogen gas as a fuel gas to anode electrodes of the single cells and supplying air as an oxidant gas to cathode electrodes thereof. This SOFC usually has a cell stack in which the plural single cells are provided in parallel.

An example of such a SOFC is described in Japanese Patent Application Laid-Open No. 2007-179884 (hereinafter, Patent Document 1). In the fuel cell described in Patent Document 1, air supply pipes for supplying the air to plural single cells are disposed among the plural single cells and in parallel with a longitudinal direction of the plural single cells.

An example of such a SOFC is described in Japanese Patent Application Laid-Open No. 2008-300276 (hereinafter, Patent Document 2). The fuel cell described in Patent Document 2 has air supply pipes disposed on a wall surface of a power generation chamber (a cell chamber), in which plural single cells are housed, and projected into the power generation chamber. The air is delivered from plural jetting holes formed in this air supply pipes to the single cells to supply the air to cathode electrodes of the single cells.

An example of such a SOFC is described in Japanese Patent Application Laid-Open No. 2008-34205 (hereinafter, Patent Document 3). The fuel cell described in Patent Document 3 has a reactive gas lead-in member disposed in a power generation chamber to sandwich a cell stack, in which plural single cells are provided in parallel, from both sides thereof. The air is discharged from plural openings, which are formed in a lower part of the reactive gas lead-in member, into the power generation chamber and blown against the sides of the cell stack.

A fuel cell is required to efficiently perform stable power generation reaction. As one of methods that satisfy this requirement, there is a method of uniformly supplying a reactive gas containing a fuel gas and an oxidant gas to respective single cells included in a cell stack.

However, in Patent Document 1, there is no reference to the uniform supply of the reactive gas to the respective plural single cells. The fuel cell described in Patent Document 1 needs spaces for disposing the air supply pipes among the single cells. In the fuel cell, it is difficult to further reduce the size of the power generation chamber. When the fuel cell is assembled, there is a risk that the single cells and the air supply pipes collide with each other and a deficiency such as breakage of the single cells occurs.

Like the fuel cell described in Patent Document 1, the fuel cell described in Patent Document 2 needs spaces for disposing the air supply pipes. When the fuel cell described in Patent Document 2 is assembled, there is a risk that the single cells and the air supply pipes collide with each other and a deficiency such as breakage of the single cells occurs. In this fuel cell, for the purpose of evenly dispersing the air in the power generation chamber, the plural jetting holes are formed in the air supply pipes. However, a configuration for efficiently, surely, and equally supplying the air to the single cells arranged near the jetting holes, the single cells arranged far from the jetting holes, or the single cells arranged in the middle of the cell stack is not examined.

In the fuel cell described in Patent Document 3, the plural openings are formed in the lower part of the reactive gas lead-in member and the air is blown against the sides of the cell stack from the openings. This fuel cell has a problem same as that of the fuel cell described in Patent Document 2. Specifically, a configuration for efficiently, surely, and equally supplying the air to the single cells arranged near the openings, the single cells arranged far from the openings, or the single cells arranged in the middle of the cell stack is not examined.

SUMMARY OF THE INVENTION

The present invention has been devised in view of such circumstances and it is an object of the present invention to provide a fuel cell that not only can equally supply a reactive gas into a chamber in which plural single cells are housed but also can equally and efficiently supply the reactive gas to all single cells included in a cell stack.

In order to attain this object, a fuel cell according to the present invention is a fuel cell that generates power when one of a fuel gas and an oxidant gas is supplied as a first reactive gas and the other is supplied as a second reactive gas. This fuel cell includes a cell stack and a first sidewall vertically provided on the outer side of the cell stack.

In the cell stack, plural single cells are collected and vertically provided such that main axis directions of the respective single cells extend along one another. At least some of the collected single cells are arranged in a row and form linear cell groups.

In the single cells, inner flow channels for allowing the first reactive gas to pass are formed. The single cells cause power generation reaction when the first reactive gas is allowed to pass along the main axis direction from one end side to the other end side of the inner flow channels and the second reactive gas is brought into contact with an outer circumferential portion of the single cells.

The first sidewall is vertically provided on the outer side of the cell stack along the main axis direction of the single cells. First holes for supplying the second reactive gas are formed in the first sidewall along an aligning direction (lateral direction) that is a direction in which the single cells included in the linear cell groups are arranged side by side in rows. The first holes are formed such that only a part of a region projected in the aligning direction (lateral direction) interferes with the single cells included in the linear cell groups. A part of the second reactive gas supplied from the first holes brushes against the front single cells in the linear cell groups and, on the other hand, the remaining second reactive gas flows to the single cells in the back without brushing against the single cell.

In this fuel cell, the single cells are disposed in a line along a jetting direction (lateral direction) of the second reactive gas jetted from the first holes and a part of the second reactive gas brushes against at least the front single cells in the linear cell groups. Therefore, the reactive gas brushing against the front single cells hits against the front single cells and is directly supplied to the front single cells. On the other hand, in the second reactive gas, the gas not brushing against the front single cells flows further to the inside than the front single cells. Because of an air flow caused by the brushing of a part of the second reactive gas against the front single cells, a part of the second reactive gas flowing to the far side brushes against the single cells in the back disposed behind the front single cells. The second reactive gas not brushing against the single cells in the back sequentially separate into a brushing part and a non-brushing part as explained above and reaches the far side. Therefore, the second reactive gas can be equally and efficiently supplied to the single cells disposed near the first sidewall and the single cells disposed in a position away from the first sidewall (a position in the far side along the rows of the linear cell groups).

"Brush" means "slightly touch". In the present invention, since a part of the second reactive gas brushes against the single cell, a part of the reactive gas slightly touches the single cell.

In the fuel cell according to the present invention, it is also desirable that the first holes are formed such that the region projected in the aligning direction (lateral direction) does not interfere with the center lines in the main axis direction of the respective single cells included in the linear cell groups.

When the part directly hitting against the single cells is too large in the second reactive gas jetted from the first holes, turbulence occurs in the flow of the second reactive gas in a position of the single cells where the second reactive gas hit. When the turbulence occurs in the flow of the second reactive gas, in some case, the second reactive gas hardly reaches the single cells arrayed further side than the single cells directly hit by the second reactive gas. Therefore, to prevent the second reactive gas directly hitting against the single cells from becoming excessive, the first holes are formed not to interfere with the center line in the main axis direction of the single cells. Since the first holes are formed not to interfere with the center line of the single cell, in the second reactive gas jetted from the first holes, the part of the second reactive gas directly hitting against the single cells can be surely suppressed to only brushes against the single cell. Therefore, in the second reactive gas jetted from the first holes, the part directly hitting against the single cells can be prevented from becoming excessive, surely suppressed to only brush against the single cell, and surely suppress the turbulence from occurring in the flow of the second reactive gas. Therefore, in addition to the advantage explained above, the second reactive gas can be more equally and efficiently supplied to the respective single cells.

In the fuel cell according to the present invention, it is also desirable to provide a second sidewall vertically provided along the aligning direction (lateral direction) on the outer side of the cell stack and along the main axis direction. The plural single cells arranged opposed to the second sidewall on the outer side of the cell stack are arranged in rows and form an outer side linear cell group. In the first sidewall, second holes for supplying the second reactive gas to a region between the second sidewall and the outer side linear cell group are formed to have a smaller opening area than an opening area of the first holes.

In a housing chamber such as a power generation chamber in which the cell stack is housed, for example, the second reactive gas jetted from the first holes provided near the center of the first sidewall diffuses to a space in the housing chamber. According to this diffusion, a sufficient reactive gas is supplied to the single cells included in the linear cell group on the center side of the housing chamber near the first holes. On the other hand, the gas jetted from the first holes provided near the second sidewall tends to diffuse on one side in the center direction of the housing chamber because the second sidewall acts as resistance. It is also conceivable that the second reactive gas is hardly supplied to the region formed between the second sidewall and the plural single cells forming the outer side linear cell group and reactive gas insufficiency tends to occur. In some case, it is difficult to supply an equal reactive gas to the plural cells forming the outer side linear cell group in the same manner as supplying the reactive gas to the single cells forming the other linear cell groups.

Since the second holes for jetting the second reactive gas to the region formed between the second sidewall and the outer side linear cell group are further formed in the first sidewall, the second reactive gas can also be supplied to this region from the second holes. Since a supply amount of the second reactive gas supplied to this region increases, a state in which the reactive gas is insufficient in this region can be suppressed. The second reactive gas can be equally supplied to the plural single cells forming the outer side linear cell group in the same manner as supplying the reactive gas to the other single cells.

The opening area of the second holes is set smaller than the opening area of the first holes. A velocity of flow of the second reactive gas supplied from the second holes is higher than a velocity of flow of the second reactive gas supplied from the first holes. Therefore, the second reactive gas with the higher velocity of flow can be supplied to the region formed between the second sidewall and the outer side linear cell group against the second sidewall acting as resistance. By supplying the second reactive gas in this way, it is possible to cause the second reactive gas to efficiently reach the single cells located on the inner part of the outer side linear cell group as well. Therefore, in addition to the advantages explained above, the reactive gas can be more equally and efficiently supplied to the respective fuel cells.

In the fuel cell according to the present invention, it is also desirable that the second holes are formed such that the region projecting in the aligning direction (lateral direction) does not interfere with the outer side linear cell group.

Since the second holes are formed in this way, the second reactive gas jetted from the second holes does not directly hit against at least the front single cell of the outer side linear cell group. A main stream of the second reactive gas passing through this front single cell directly flows without hitting against the single cells in the back. The main stream of the second reactive gas is not blocked by the single cells. Resistance in causing the second reactive gas to reach a position equivalent to the single cells arrayed on the far side of the outer side linear cell group can be reduced. The second reactive gas jetted from the second holes includes a main stream flowing along a jetting direction (lateral direction) of the second reactive gas and a diffusing stream flowing while diffusing to the outer side of the main stream. More specifically, immediately after being jetted from the second holes, since a speed component of the direct flow in the jetting direction (lateral direction) is large, the main stream occupies a large portion compared with the diffusing stream. On the other hand, when the second reactive gas is jetted from the second holes and flows near the outer side linear cell group, the speed component of the direct flow is reduced by the air resistance and the diffusing flow increases. Therefore the diffusing stream tends to relatively increase. In this preferred embodiment of the present invention, the main stream of the second reactive gas is jetted without being hit against the single cells to sequentially hit the sequentially-occurring diffusing stream against the single cells forming the outer side linear cell group. Therefore, it is possible to cause the reactive gas to efficiently reach the single cells arrayed in the far side of the outer side linear cell group in the same manner as causing the reactive gas to reach the single cells arrayed near the first sidewall.

In the fuel cell according to the present invention, it is also desirable that, in the first sidewall, third holes for supplying the second reactive gas to the outer side linear cell group are formed in a position opposed to the outer side linear cell group.

The second holes are formed to interfere with none of the single cells when the second holes are projected in the jetting direction (lateral direction) of the second reactive gas. The main stream of the second reactive gas supplied from the second holes does not directly hit the single cells and only the diffusing stream comes into contact with the single cells. The velocity of flow of the second reactive gas supplied from the second holes has a relatively high velocity of flow. It is possible to cause the second reactive gas to sufficiently reach the plural single cells in far side forming the outer side linear cell group. In this way, the first priority is to cause the second reactive gas to be reached the single cells in the far side and the velocity of flow of the second reactive gas is sufficiently increased. Then, it is likely that the second reactive gas hardly directly comes into contact with the single cells on the front side among the plural single cells forming the outer side linear cell group. Even when the diffusing stream of the second reactive gas is taken into account, if the second reactive gas passes without coming into contact with the single cells on the front side, the second reactive gas is hardly supplied to the single cells on the front side.

Further, the opening area of the second holes is set smaller than the opening area of the first holes. The velocity of flow of the second reactive gas jetted from the second holes is set higher than the velocity of flow of the second reactive gas jetted from the first hole. In some case, since the first priority is given to improvement of the velocity of flow, it is likely that an amount of the second reactive gas jetted from the second holes is insufficient.

Therefore, the third holes are formed and the second reactive gas is jetted from the third holes to the plural single cells forming the outer side linear cell group. By jetting the second reactive gas from the third holes, the second reactive gas can be directly hit against the single cells on the front side of the outer side linear cell group. This makes it possible to supplement the amount of the second reactive gas jetted to the single cells forming the outer side linear cell group. In particular, it is possible to effectively suppress reactive gas insufficiency in the single cells arranged on the front side of the outer side linear cell group.

In the fuel cell according to the present invention, it is desirable that the first holes are also formed in a position opposed to the region between the second sidewall and the outer side linear cell group. The first holes are formed in a position opposed to the one end side of the single cells included in the linear cell groups such that only a part of the region projected in the aligning direction (lateral direction) of the outer side linear cell group interferes with the single cells included in the outer side linear cell group. It is also desirable that the second holes are formed in a position equivalent to the other end side of the outer side linear cell group.

Since the fuel cell generates power under a high-temperature environment, the reactive gas tends to be heated to form an ascending current. To use this ascending current, the second reactive gas is supplied from a lower part on one end side of the single cells via the first holes. The second reactive gas is efficiently supplied from one end side to the other end side of the respective single cells, in other words, in the entire height direction from down to up. Since the second reactive gas has high rectilinearity immediately after the second reactive gas is jetted from the first holes, the second reactive gas relatively less easily diffuses. In some case, the second reactive gas supplied from a lower part passes without sufficiently diffusing to an upper part. It is likely that the second reactive gas is insufficiently supplied to upper parts of the single cells disposed on the first sidewall side (the front side). Among the single cells forming the outer side linear cell group, in the first place, the second reactive gas tends to be insufficiently supplied to the single cells located on the front side because of the resistance of the second sidewall. In particular, reactive gas insufficiency tends to occur in upper parts of the single cells. Therefore, by supplying the second reactive gas from the other end side in the upper parts of the single cells via the second holes, the second reactive gas can be more efficiently supplied to the entire cell stack.

In the fuel cell according to the present invention, it is also desirable that the first holes for supplying the second reactive gas to the linear cell groups are formed in the position opposed to one end side of the single cells included in the linear cell groups. The first holes are formed such that only a part of the region projected in the aligning direction (lateral direction) of the linear cell groups interferes with the single cells included in the outer-side linear cell group. It is also desirable that the second holes are formed in both the position equivalent to one end side and the position equivalent to the other end side of the single cells included in the outer side linear cell group.

By supplying the second reactive gas via the first holes and using the ascending current, the second reactive gas can be more efficiently supplied in the entire up to down direction of the respective single cells. The second reactive gas can be supplied from a lower part and an upper part to the outer side linear cell group in which reactive gas insufficiency tends to occur. Therefore, the second reactive gas can be more efficiently supplied to the entire cell stack.

In the fuel cell according to the present invention, it is also desirable that the first holes for supplying the second reactive gas to the linear cell groups are formed in the position opposed to one end side of the single cells included in the linear cell groups. The first holes are formed such that only a part of the region projected in the aligning direction (lateral direction) of the linear cell groups interferes with the single cells included in the outer side linear cell group. It is also desirable that the second holes are formed in the position equivalent to the other end side of the single cells included in the outer side linear cell group. It is also desirable that the third holes are formed in a position opposed to the other end side of the single cells included in the outer side linear cell group.

By supplying the second reactive gas via the first holes and using the ascending current, the second reactive gas can be more efficiently supplied in the entire up to down direction of the respective single cells. Since the second reactive gas has high rectilinearity immediately after the second reactive gas is jetted from the first holes, the second reactive gas relatively less easily diffuses. In some case, the second reactive gas supplied from a lower part passes without sufficiently diffusing to an upper part. It is likely that the second reactive gas is insufficiently supplied to upper parts of the single cells disposed on the first sidewall side (the front side). Among the single cells forming the outer side linear cell group, in the first place, the second reactive gas tends to be insufficiently supplied to the single cells located on the front side because of the resistance of the second sidewall. In particular, reactive gas insufficiency tends to occur in upper parts of the single cells.

Therefore, by supplying the second reactive gas from the other end side in the upper parts of the single cells via the second holes and the third holes, the second reactive gas can be more efficiently supplied to the entire cell stack.

In the fuel cell according to the present invention, it is also desirable that the first holes for supplying the second reactive gas to the linear cell groups are formed in the position opposed to one end side of the single cells included in the linear cell groups. The first holes are formed such that only a part of the region projected in the aligning direction (lateral direction) of the linear cell groups interferes with the single cells included in the outer-side linear cell group. It is also desirable that the second holes are formed in both the position equivalent to one end side and the position equivalent to the other end side of the single cells included in the outer side linear cell group. It is also desirable that the third holes are formed in both the position opposed to one end side and the position equivalent to the other end side of the single cells included in the outer side linear cell group.

By supplying the second reactive gas via the first holes and using the ascending current, the second reactive gas can be more efficiently supplied in the entire up to down direction of the respective single cells. The second reactive gas can be supplied, via the second holes and the third holes, from a lower part and an upper part to the outer side linear cell group in which reactive gas insufficiency tends to occur. Therefore, irrespectively of a disposed position of the single cells, the second reactive gas can be more efficiently supplied to the entire cell stack.

In the fuel cell according to the present invention, it is also desirable that fourth holes for supplying the second reactive gas to the region between the second sidewall and the outer side linear cell group are formed in the first sidewall. The fourth holes are formed in a position equivalent to a position between one end side and the other end side of the single cells included in the outer side linear cell group.

The reactive gas is jetted to lower parts of the single cells via the first holes. The second reactive gas is jetted, via the second holes, to an upper part of the outer-side linear cell group where reactive gas insufficiency particularly tends to occur. The second reactive gas is also jetted to the center of the single cells disposed in the outer side linear cell group. Therefore, it is possible to more efficiently supply the second reactive gas in the entire up to down direction of the respective single cells and to the entire cell stack.

In the fuel cell according to the present invention, it is also desirable that an opening area of the fourth holes is set smaller than the opening area of the first holes and larger than the opening areas of the second holes.

By forming the fourth holes in this way, a velocity of flow of the second reactive gas supplied from the fourth holes can be set higher than that of the second reactive gas supplied from the first holes and lower than that of the second reactive gas supplied from the second holes. In other words, a velocity of flow of the second reactive gas supplied to the region between the second sidewall and the outer side linear cell group can be set higher from one end side toward the other end side of the single cells included in the outer side linear cell group. The upper side of the single cells included in the outer side linear cell group in a region where reactive gas insufficiency tends to occur, the second reactive gas with higher velocity is supplied. Therefore, the second reactive gas can be efficiently supplied in the entire up to down direction of the single cells. In addition, irrespectively of a disposed position of the single cells, the second reactive gas can be more efficiently supplied to the entire cell stack.

DETAILED DESCRIPTION OF THE PREFERRED EMBODIMENTS

Fuel cells according to embodiments of the present invention are explained below with reference to the accompanying drawings. The embodiments described below are exemplars for explaining the present invention. The present invention is not limited to only these embodiments. Therefore, the present invention can be carried out in various forms without departing from the spirit of the present invention.

Figure 1:
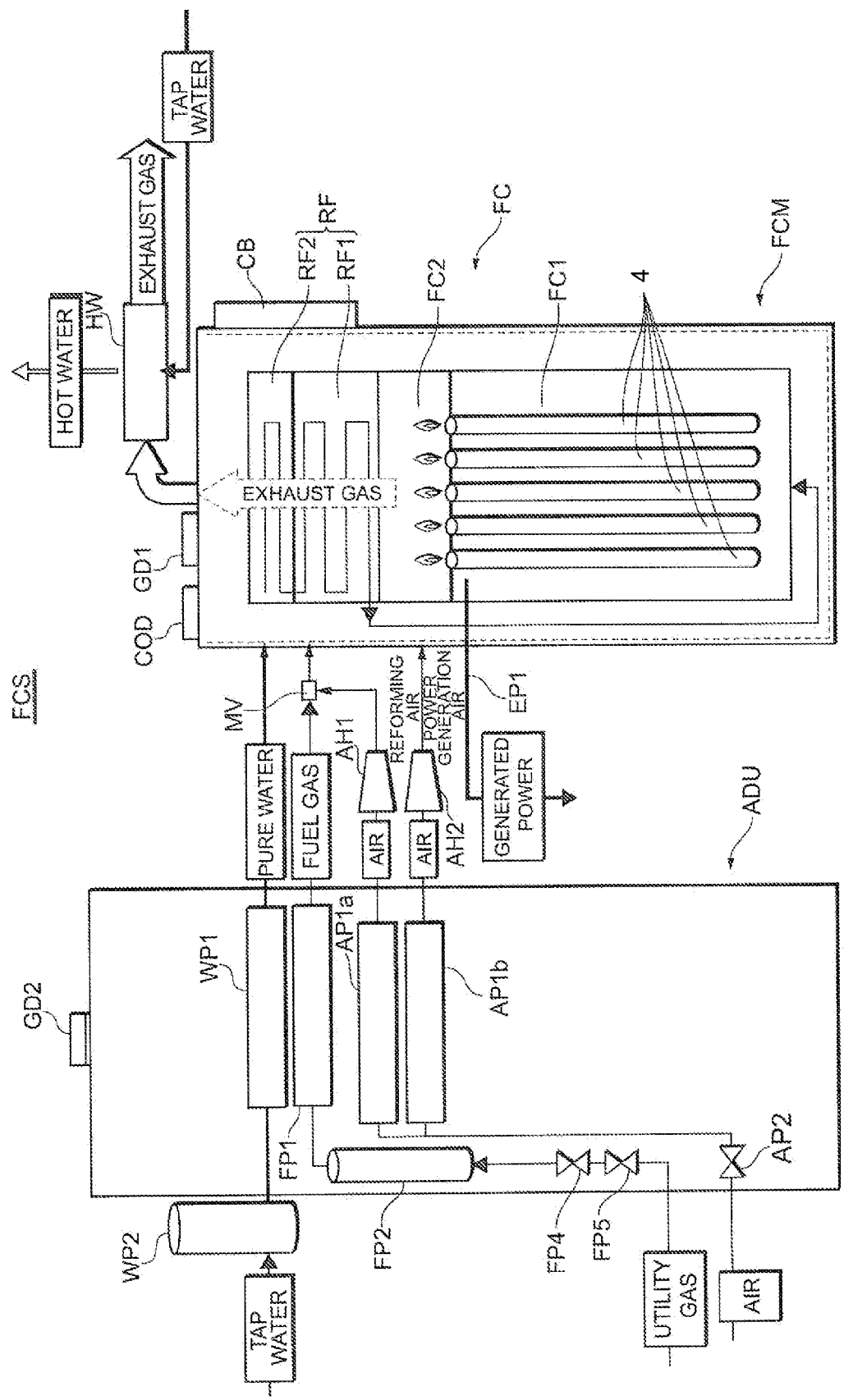
FIG. 1 is a schematic diagram showing the overall configuration of a fuel cell system including a fuel cell according to an embodiment of the preset invention.
Figure 2:
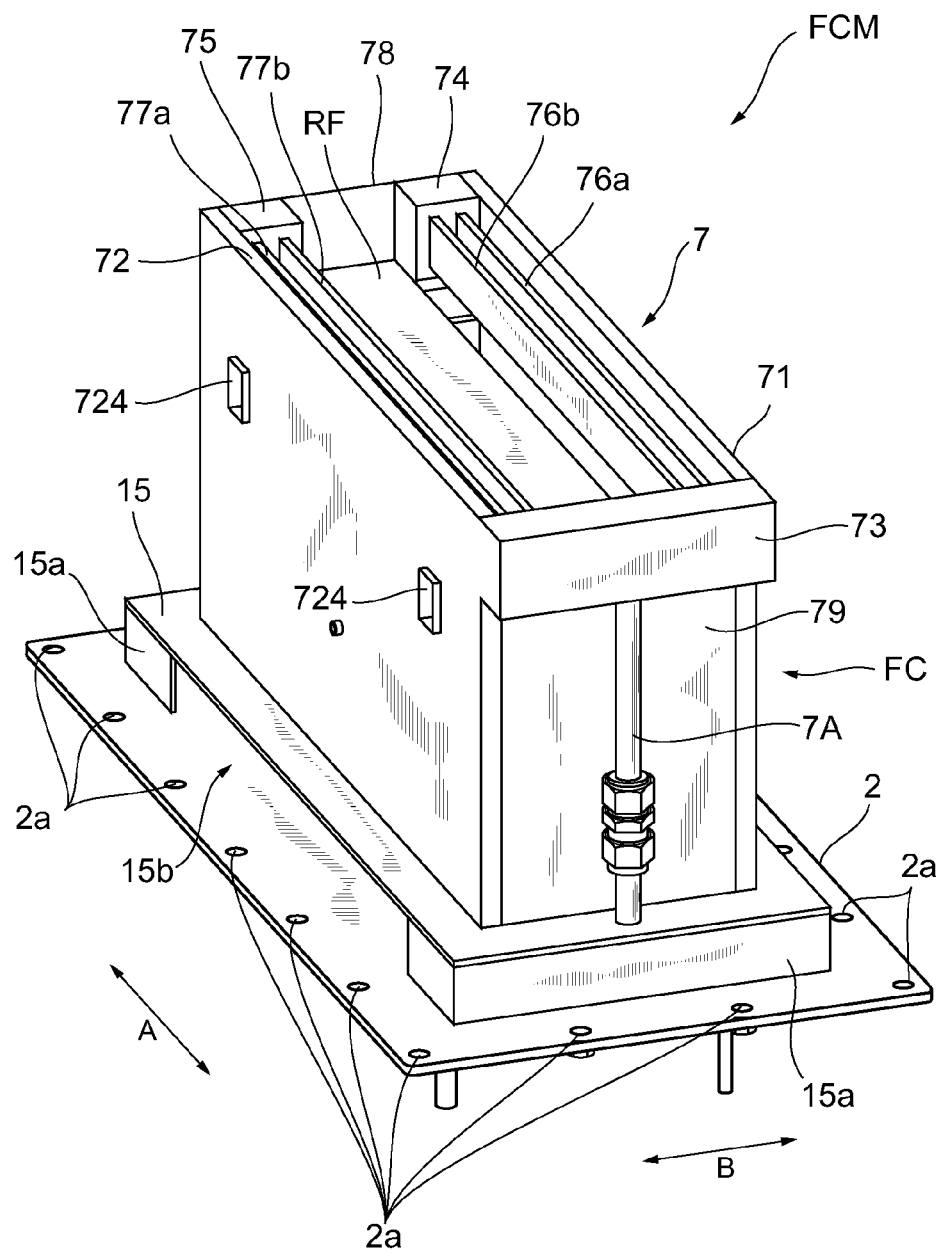
FIG. 2 is a perspective view showing a fuel cell module shown in FIG. 1 in a state in which a cover member is removed.
Figure 3:
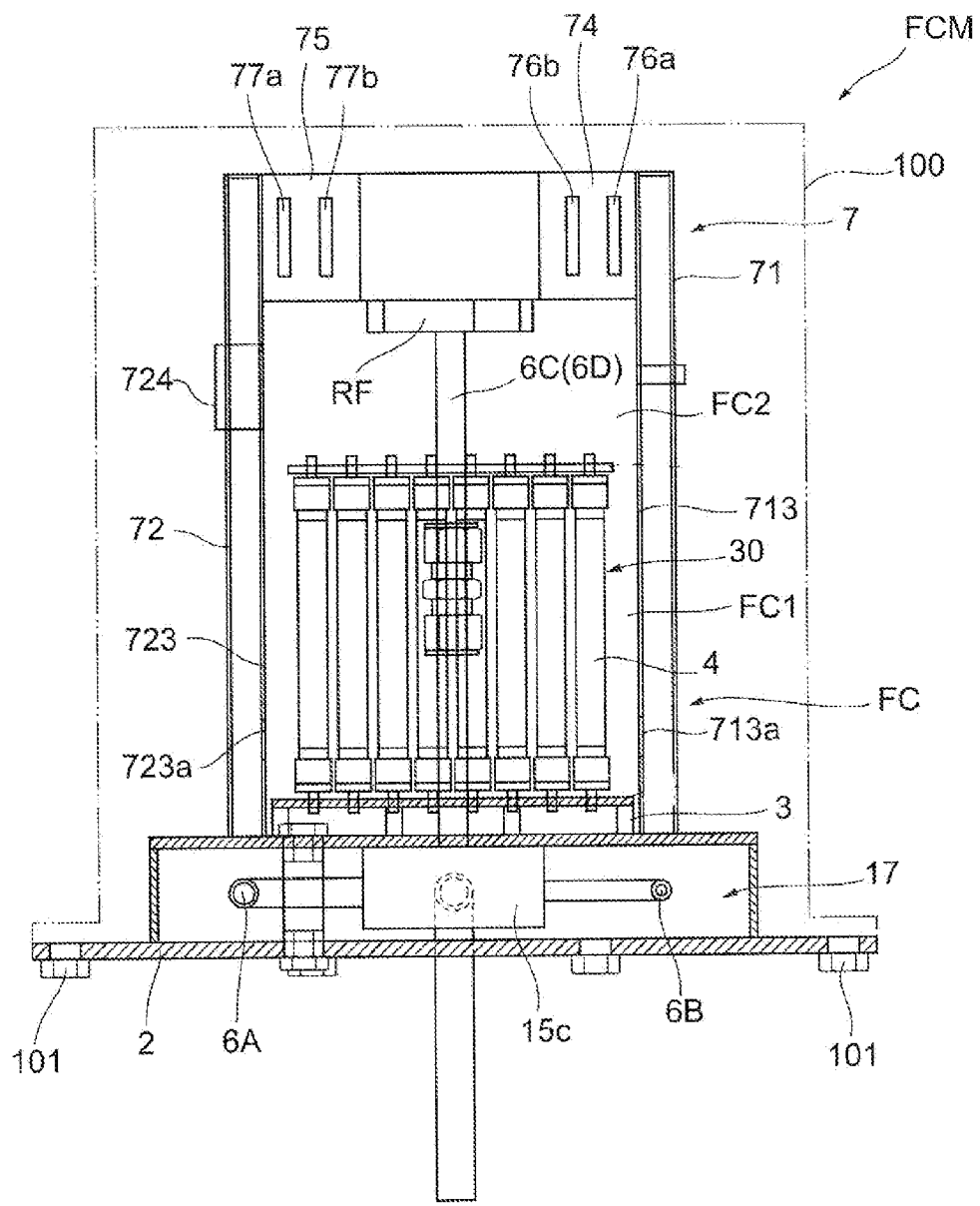
FIG. 3 is a sectional view of the fuel cell module shown in FIG. 2 taken along a surface perpendicular to an arrow A direction.
Figure 4:
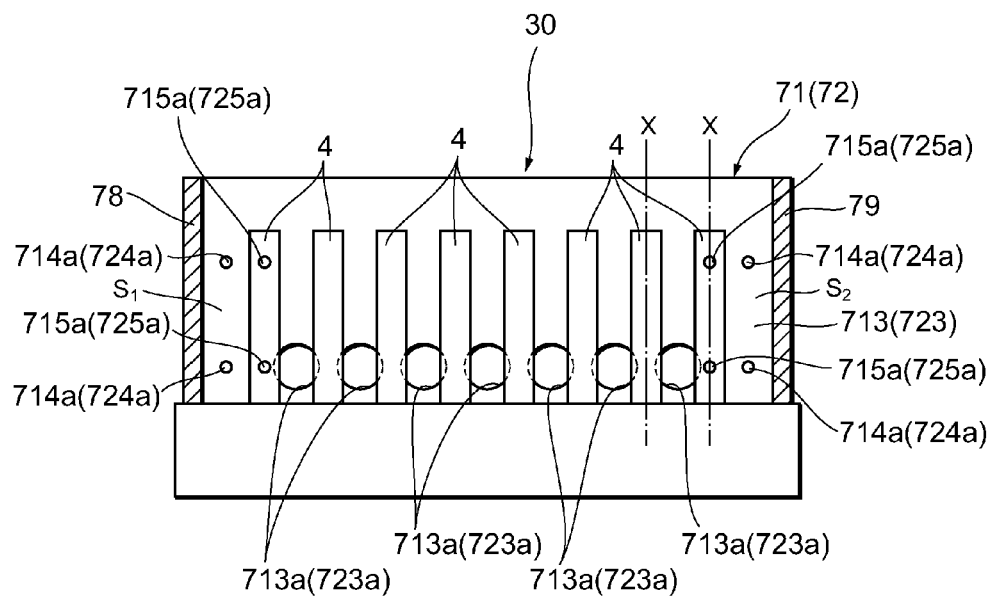
FIG. 4 is a sectional schematic view schematically showing a part of a section of the fuel cell module shown in FIG. 2 taken along a surface perpendicular to an arrow B direction.
Figure 5:
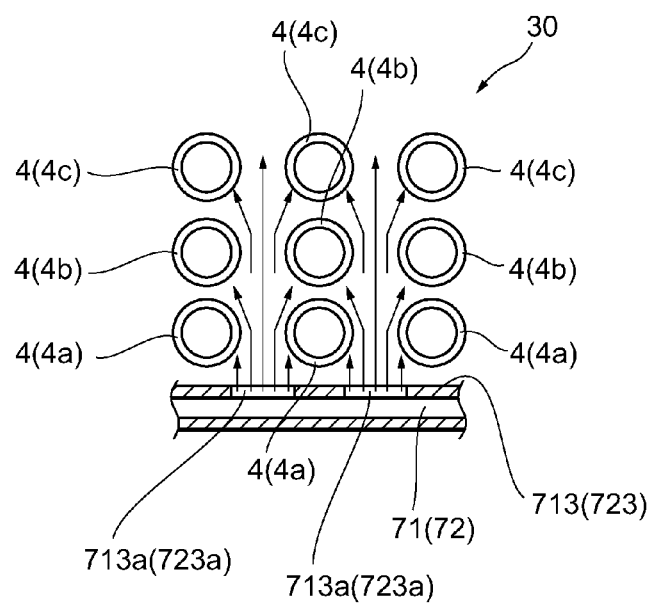
FIG. 5 is a plan schematic view schematically showing a part of a flow of the air supplied to the fuel cell shown in FIG. 4.
Figure 6:
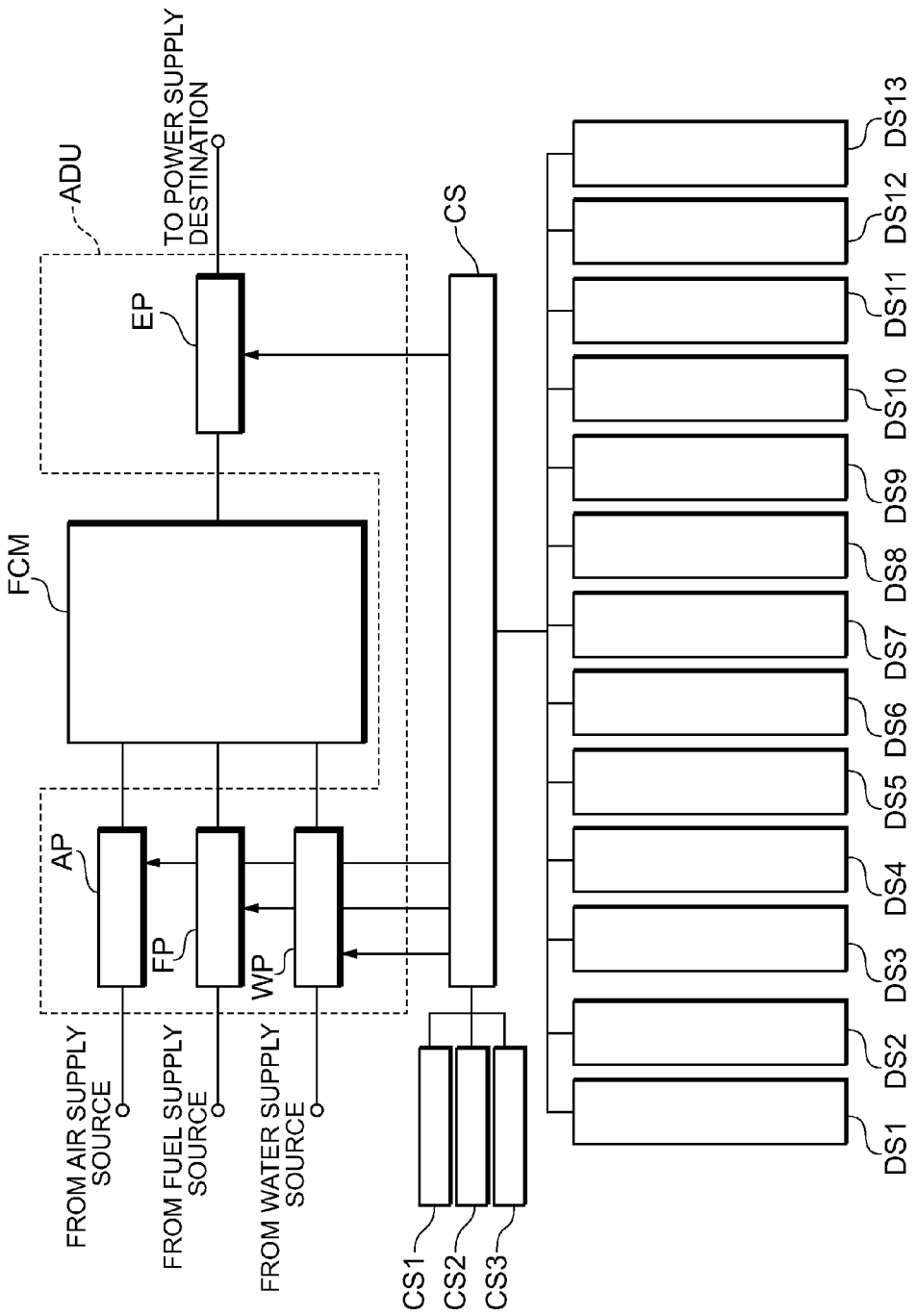
FIG. 6 is a block diagram showing a control configuration of the fuel cell system shown in FIG. 1.
Figure 7:
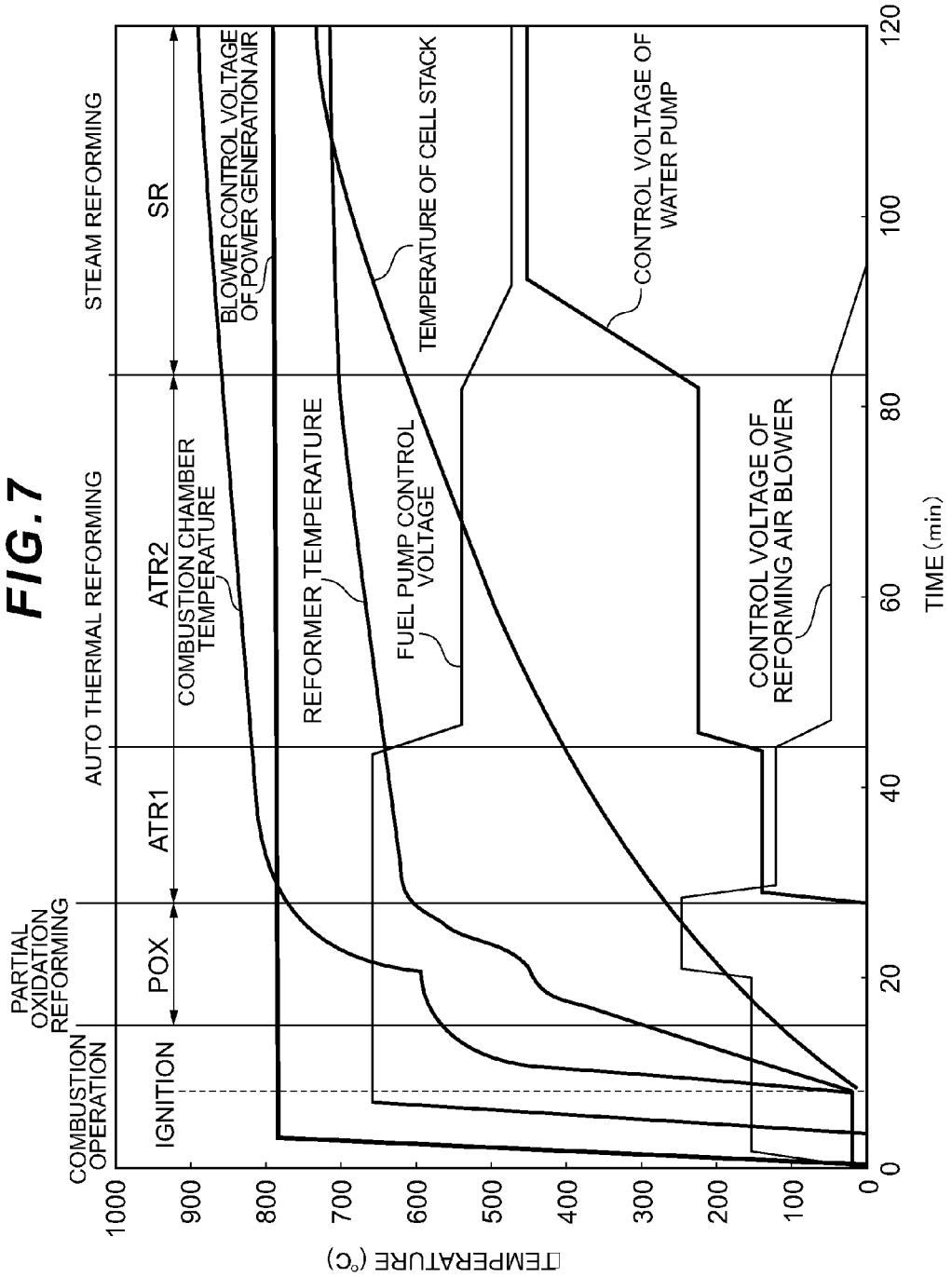
FIG. 7 is a graph showing temperatures of units and control voltages of the units during the start of the fuel cell system shown in FIG. 1.

A fuel cell system including a fuel cell according to an embodiment of the present invention is explained with reference to FIGS. 1 to 7. FIG. 1 is a schematic diagram showing the overall configuration of a fuel cell system including a fuel cell according to an embodiment of the preset invention. FIG. 2 is a perspective view showing a fuel cell module shown in FIG. 1 in a state in which a cover member is removed. FIG. 3 is a sectional view of the fuel cell module shown in FIG. 2 taken along a surface perpendicular to an arrow A direction. FIG. 4 is a sectional schematic view schematically showing a part of a section of the fuel cell module shown in FIG. 2 taken along a surface perpendicular to an arrow B direction. FIG. 5 is a plan schematic view schematically showing a part of a flow of the air supplied to the fuel cell shown in FIG. 4. FIG. 6 is a block diagram showing a control configuration of the fuel cell system shown in FIG. 1. FIG. 7 is a graph showing temperatures of units and control voltages of the units during the start of the fuel cell system shown in FIG. 1. In these figures, to facilitate understanding of explanation, thicknesses, sizes, expansion and reduction ratios, and the like of members are not the same as actual ones in some cases.

As shown in FIG. 1, a fuel cell system FCS including a fuel cell according to the present invention includes a fuel cell module FCM, an auxiliary device unit ADU, a water storage tank WP2, a hot water producing device HW.

As shown in FIGS. 1 to 3 and FIG. 6, the fuel cell module FCM includes a fuel cell FC, a reformer RF, a control box CB, a carbon monoxide detector COD, and a combustible gas detector GD1. The fuel cell module FCM has a cover member 100 (an external shape of the cover member 100 is indicated by an alternate long and two short dashes line in FIG. 3). The cover member 100 is formed in a rectangular parallelepiped shape by a pair of sidewalls in a longitudinal direction, a sidewall on the rear side, and a ceiling. Flange sections are formed at lower ends of the sidewalls. The flange sections are set in contact with a base member 2, whereby a space closed by the cover member 100 and the base member 2 is formed. The cover member 100 and the base member 2 are fixed by bolts 101. The bolts 101 pierce through attaching holes provided in the cover member 100 and pierce through attaching holes 2a provided in the base member 2 to fix the cover member 100 and the base member 2.

An inner space formed by the cover member 100 and the base member 2 is divided into two spaces by a partition plate 15. In the space located in an upper part of the divided spaces, the fuel cell FC and the reformer RF are disposed. On the other hand, the space located in a lower part is an exhaust gas chamber 17. The partition plate 15 is placed on supporting members 15a provided in the base member 2. The partition plate 15 is held at a predetermined distance apart from the base member 2. A pair of supporting members 15a is provided to support the partition plate 15 at both ends in a longitudinal direction. Therefore, a gap 15b (an inlet port) is formed between the pair of supporting members 15a and 15a. An exhaust gas passing through an exhaust gas passage provided in a wall surface of the cover member 100 is led into the exhaust gas chamber 17 from the gap 15b. The exhaust gas led into the exhaust gas chamber 17 is discharged to the outside from an exhaust port.

A gas tank 3 is placed on the partition plate 15. The fuel cell FC is disposed on the gas tank 3. The fuel cell FC is a solid-oxide fuel cell. As shown in FIGS. 1 to 3, the fuel cell FC includes a power generation chamber FC1 and a combustion chamber FC2. In the power generation chamber FC1, a cell stack 30 in which plural single cells 4 are vertically arranged is disposed. Specifically, in the cell stack 30, plural (in this embodiment, eight as shown in FIG. 3) single cells 4 are disposed in an arrow B direction shown in FIG. 2. Plural rows of the single cells 4 are disposed in an arrow A direction shown in FIG. 2 (in FIG. 4, briefly, eight rows are shown).

The single cells 4 are formed in a hollow cylindrical shape. In the single cells 4, a fuel electrode is provided on an inner side across an electrolyte and an air electrode is provided on an outer side across the electrolyte. The single cells 4 are configured to be capable of causing power generation reaction when a fuel gas is allowed to pass to the fuel electrode side and the air as an oxidant gas is allowed to pas to the air electrode side. In this embodiment, the fuel gas from the gas tank 3 is supplied to the fuel electrodes of the single cells 4. As explained in detail later, the air from air supply holes 723a is supplied to the air electrodes of the single cells 4. In this embodiment, gas flowing through pipes (the fuel electrodes) of the single cells 4 is a reformed gas obtained by reforming a utility gas or the like or a fuel gas such as hydrogen. Gas flowing outside the pipes (through the air electrodes) of the single cells 4 is an oxidant gas such as the air containing oxygen.

The fuel cell FC according to this embodiment is a solid-oxide fuel cell. Therefore, as a material forming the electrolyte, a material is used such as zirconium doped with at least one kind selected out of rare earth elements such as Y and Sc, cerium doped with at least one kind selected out of the rare earth elements, or lanthanum gallate doped with at least one kind selected out of Sr and Mg.

As the material forming the fuel electrode, a material is used such as a mixture of Ni and zirconium doped with at least one kind selected out of rare earth elements such as Ca, Y, and Sc, a mixture of Ni and cerium doped with at least one kind selected out of the rare earth elements, or a mixture of Ni and lanthanum gallate doped with at lest one kind selected out of Sr, Mg, Co, Fe, and Cu.

As a material forming the air electrode, a material is used such as lanthanum manganite doped with at least one kind selected out of Sr and Ca, lanthanum ferrite doped with at least one kind selected out of Sr, Co, Ni, and Cu, lanthanum cobalt doped with at least one kind selected out of Sr, Fe, Ni, and Cu, or silver. However, the materials forming the electrolyte, the fuel electrode, and the air electrode are not limited to these.

Electricity generated in the power generation chamber FC1 is extracted as generated power by a power extraction line EP1 and used. The combustion chamber FC2 is located above the power generation chamber FC1. The combustion chamber FC2 is a section that burns a residual fuel gas of the fuel gas used for the power generation reaction by the single cells 4 arranged in the power generation chamber FC1. An exhaust gas generated as a result of burning of the fuel gas in the combustion chamber FC2 is subjected to heat exchange with the reformer RF. Thereafter, the exhaust gas is sent to the exhaust gas chamber 17 explained later and supplies to the hot water producing device HW. The exhaust gas supplied to the hot water producing device HW is further subjected to heat exchange and discharged to the outside after raising the temperature of tap water to change the tap water to hot water.

The reformer RF is a section that reforms reforming target gas into a fuel gas and supplies the fuel gas to the power generation chamber FC1 of the fuel cell FC. Reforming forms of the reforming target gas include partial oxidation reforming (POX), auto thermal reforming (ATR), and steam reforming (SR). The reforming forms are selectively executed according to an operation state. The reformer RF includes a reforming unit RF1 and an evaporating unit RF2.

The reforming unit RF1 is a section that reforms the reforming target gas using the reforming target gas and the air supplied from the auxiliary device unit ADU side and the steam supplied from the evaporating unit RF2 and changes the reforming target gas to a fuel gas. The reforming target gas, the air, and the steam are supplied through a pipe 6C disposed at one end in a longitudinal direction of the fuel cell module FCM. A reforming catalyst is contained in the reforming unit RF1. As the reforming catalyst, a reforming catalyst obtained by applying nickel to the spherical surface of alumina or a reforming catalyst obtained by applying ruthenium to the spherical surface of alumina is used as appropriate. In the case of this embodiment, these reforming catalysts are spheres. A pipe 6D for supplying the fuel gas reformed by the reformer RF to the gas tank 3 is communicated with the reformer RF1. The pipe 6D is disposed at the other end in the longitudinal direction of the fuel cell module FCM (a position opposed to the pipe 6C).

The utility gas and the air supplied to the reformer RF1 are led into the fuel cell module FCM through a supply pipe 6A. The steam supplied from the evaporating unit RF2 is led into the reformer RF1 in the fuel cell module FCM through a supply pipe 6B. The supply pipe 6A and the supply pipe 6B are connected to a mixing chamber 15c provided on the opposite side of the pipe 6C across the partition plate 15. The utility gas and the air supplied from the supply pipe 6A and the steam supplied from the supply pipe 6C are mixed in the mixing chamber 15c and supplied to the pipe 6C. The evaporating unit RF2 is a section that evaporates pure water supplied from the auxiliary device unit ADU side, changes the pure water to steam, and supplies the steam to the reforming unit RF1.

A flow channel member 7 is provided above the reformer RF. The flow channel member 7 includes a sidewall 71 (a first sidewall) and a sidewall 72 (a first sidewall), an air distributing chamber 73, an air concentrating chamber 74 and an air concentrating chamber 75, air flow channel pipes 76a, 76b, 77a, and 77b, and a sidewall 78 (a second sidewall) and a sidewall 79 (a second sidewall). In the flow channel member 7, the sidewalls 71 and 72 are arranged in a longitudinal direction and the sidewalls 78 and 79 are arranged in a latitudinal direction (lateral direction). The flow channel member 7 is formed to be a box shape by those members. The flow channel member 7 is vertically provided in the partition plate 15 to cover the reformer RF and the cell stack 30.

The air distributing chamber 73 is attached above on the outer side of the sidewall 79. The air distributing chamber 73 is attached above on the outer side and the latitudinal side of a box-like member formed by the sidewalls 71 and 72 and the sidewalls 78 and 79. A supply pipe 7A for supplying the air to the air distributing chamber 73 is communicated with the air distributing chamber 73. The air flow channel pipes 76a, 76b, 77a, and 77b are communicated with the air distributing chamber 73.

The air flow channels 76a and 76b are arranged along the sidewall 71 above the inner side and the longitudinal side of the box-like member formed by the sidewalls 71 and 72 and the sidewalls 78 and 79. The air flow channel pipe 76a is arranged on the sidewall 71 side. The air flow channel pipe 76b is arranged further inside than the air flow channel pipe 76a. One ends of the air flow channel pipes 76a and 76b are communicated with the air distributing chamber 73 piercing through the sidewall 79. The other ends thereof are communicated with the air concentrating chamber 74. Therefore, the air flowing into the air distributing chamber 73 passes through the air flow channel pipes 76a and 76b, flows into the air concentrating chamber 74, and merges again.

The air flow channel pipes 77a and 77b are arranged along the sidewall 72 above the inner side and the longitudinal side of the box-like member formed by the sidewalls 71 and 72 and the sidewalls 78 and 79. The air flow channel pipe 77a is arranged on the sidewall 72 side and the air flow channel pipe 77b is arranged further inside than the air flow channel pipe 77a. One ends of the air flow channel pipes 77a and 77b are communicated with the air distributing chamber 73 piercing through the sidewall 79. The other ends thereof are communicated with the air concentrating chamber 75. Therefore, the air flowing into the air distributing chamber 73 passes through the air flow channel pipes 77a and 77b, flows into the air concentrating chamber 75, and merges again.

The air concentrating chambers 74 and 75 are attached above the inner side of the sidewall 78. The air concentrating chambers 74 and 75 are attached above the inner side and the latitudinal side of the box-like member formed by the sidewalls 71 and 72 and the sidewalls 78 and 79. The air concentrating chamber 74 is arranged to adhere to the sidewall 71 and configured such that the air flowing into the air concentrating chamber 74 flows out to the sidewall 71. On the other hand, the air concentrating chamber 75 is arranged to adhere to the sidewall 72. The air flowing into the air concentrating chamber 75 is configured such that the air flowing into the air concentrating chamber 75 flows out to the sidewall 72.

The sidewalls 71 and 72 are formed in a double-wall structure and configured such that the air can flow in the inside thereof. In a wall surface 713 of the sidewall 71 opposed to the cell stack 30, plural air supply holes 713a (first holes) for supplying the air to the single cells 4 are formed at predetermined intervals in the horizontal direction (the arrow A direction shown in FIG. 2).

When the air supply holes 713a are projected in a direction perpendicular to the wall surface 713 (a direction in which the air is jetted), the air supply holes 713a are in a state shown in FIG. 4. The air supply holes 713a are formed to interfere with the single cells 4 included in the cell stack 30. More specifically, the air supplied from the air supply holes 713a brushes against lower parts of both the single cells 4 adjacent to each other disposed in a position closest to the sidewall 71 among plural rows (in FIG. 4, eight rows) of the single cells 4 included in the cell stack 30. The air supply holes 713a are formed in a position extending across the adjacent single cells 4. The air supply holes 713a are formed to have a portion where the air jetted from the air supply holes 713a brushes against the lower parts of the single cells 4 and a portion where the air does not brush against the lower parts of the single cells 4. The air jetted from the air supply holes 713a is jetted in a direction parallel to the sidewalls 78 and 79 (i.e., the direction perpendicular to the wall surface 713).

As shown in FIG. 4, the air supply holes 713a are formed in a size that brushes against the single cells 4 in a region not interfering with the axes X of the single cells 4. Therefore, the part of the air jetted from the air supply holes 713a and hit directly against the single cells 4 does not become excessively large. Instead, small amount of the air jetted from the air supply holes 713a hits directly against the single cells 4. Therefore, as shown in FIG. 5, when the air directly hits the single cells 4, turbulence is suppressed from occurring in a flow of the air (indicated by arrows) in positions where the air hits the single cells 4. It is possible to cause the air to sufficiently reach the single cells 4 disposed on the sidewall 72 side (the depth side viewed from the sidewall 71 side) on the opposite from the sidewall 71 side. The air supply holes 713a jet the air to the lower parts (one end side) of the single cells 4. The air jetted from the air supply holes 713a changes to an ascending current. The air can be efficiently and equally supplied in the entire height direction of the respective single cells 4.

Four air supply holes 714a (second holes) for supplying the air to the single cells 4 are formed in the wall surface 713. Two of the air supply holes 714a are formed to supply the air to a region between the sidewall 78 and the cell stack 30 when the air supply holes 714a are projected in the direction perpendicular to the wall surface 713 (the direction in which the air is jetted). The air supply holes 714a are formed, in the cell stack 30, a position opposed to a space $S_1$ (see FIG. 4) formed between the single cells 4 forming a row closest to the sidewall 78 (an outer side linear cell group) and the sidewall 78. Air supply holes 714a are formed one in each of positions respectively equivalent to the lower parts (one end side) and upper parts (the other end side) of the single cells 4.

The remaining two air supply holes 714a are formed to supply the air to a region between the sidewall 79 and the cell stack 30 when the air supply holes 714a are projected in the direction perpendicular to the wall surface 713. The air supply holes 714a are formed, in the cell stack 30, in a position opposed to a space $S_2$ (see FIG. 4) formed between the single cell 4 forming a row closest to the sidewall 79 (an outer side linear cell group) and the sidewall 79. Air supply holes 714a are formed one in each of positions respectively equivalent to the lower parts (one end side) and the upper parts (the other end side) of the single cells 4. The air jetted from the air supply holes 714a is jetted in a direction parallel to the sidewalls 78 and 79 (i.e., the direction perpendicular to the wall surface 713).

The air supply holes 714a have a diameter smaller than that of the air supply holes 713a. An opening area of the air supply holes 714a is set to be smaller than an opening area of the air supply holes 713a. The air supply holes 714a and the air supply holes 713a are holes that communicate an air flow channel formed in the sidewall 71 and a space in which the cell stack 30 is arranged. The air is steadily continued to be supplied to the air flow channel formed in the sidewall 71 at substantially the same pressure. Therefore, when a hole that communicates the air flow channel formed in the sidewall 71 and the space in which the cell stack 30 is arranged is formed, if an opening area of the hole is large, the air with a relatively low velocity of flow is jetted. On the other hand, if the opening area of the hole is small, the air with a relatively high velocity of flow is jetted. Therefore, the air jetted from the air supply holes 714a is jetted at velocity higher than that of the air jetted from the air supply holes 713a. In this embodiment, the velocity of flow of the air jetted from the air supply holes 713a and the velocity of flow of the air jetted from the air supply holes 714a are set different by a simple method of setting the opening areas of the air supply holes 713a and the air supply holes 714a different in this way. In this embodiment, a manner in which the air supply holes 714a and the air supply holes 713a are formed in the same air flow channel is adopted. However, a manner of formation of the air supply holes 713a and 714a is not limited to this. It is also desirable that the air supply holes 713a and the air supply holes 714a are formed in separate air flow channels as long as the velocities of flow of the air jetted from the air supply holes 713a and 714a change according to an opening area. Such an idea of formation of the air supply holes is common in other air holes explained below. With such a configuration, it is possible to cause the air to reach the inner part of the cell stack 30. The air with the high velocity of flow can be supplied from the air supply holes 714a to upper parts and lower parts of the spaces $S_1$ and $S_2$ in which air insufficiency tends to occur. Therefore, the air insufficiency is eliminated and the air can be efficiently and equally supplied to the entire cell stack 30.

Further, in the wall surface 713, four air supply holes 715a (third holes) for supplying the air to the single cells 4 are formed. Two of the air supply holes 715a are formed, in the cell stack 30, in a position opposed to the single cells 4 forming the row closest to the sidewall 78 (the outer side linear cell group) when the air supply holes 715a are projected in the direction perpendicular to the wall surface 713 (the direction in which the air is jetted). Air supply holes 715a are formed one in each of positions respectively equivalent to the lower parts (one end side) and the upper parts (the other end side) of the single cells 4.

The remaining two air supply holes 715a are formed, in the cell stack 30, in a position opposed to the single cells 4 forming the row closest to the sidewall 79 (the outer side linear cell group) when the air supply holes 715a are projected in the direction perpendicular to the wall surface 713. Air supply holes 715a are formed one in each of positions respectively equivalent to the lower parts (one end side) and the upper parts (the other end side) of the single cells 4. The air jetted from the air supply holes 715a is jetted in a direction parallel to the sidewalls 78 and 79 (i.e., the direction perpendicular to the wall surface 713).

As shown in FIG. 4, the air supply holes 715a are formed such that, when the air supply holes 715a are projected in the direction perpendicular to the wall surface 713 (the direction in which the air is jetted), the centers of the air supply holes 715a substantially coincide with the axes X of the single cells 4. In addition to the air supplied from the air supply holes 713a and 714a, the air from the air supply holes 715a can be supplied to a portion in which reactive gas insufficiency tends to occur (i.e., the row closest to the sidewall 78 and the row closest to the sidewall 79) in the cell stack 30. Therefore, air insufficiency is eliminated and the air can be efficiently and equally supplied to the entire cell stack 30.

A wall surface 723 of the sidewall 72 opposed to the cell stack 30 is symmetrical to the wall surface 713. In the wall surface 723, as in the wall surface 713, air supply holes 723a same as the air supply holes 713a, air supply holes 724a same as the air supply holes 714a, and air supply holes 725a same as the air supply holes 715a are formed. An ignition device insertion hole 724 is provided in a portion corresponding to the combustion chamber FC2 of the sidewall 72. In the ignition device insertion hole 724, an ignition device for starting combustion of a combustion gas and the air is projected to face the inside of the combustion chamber FC2. The fuel gas and the air are mixed and burned by the ignition device. The single cells 4 are heated by the combustion chamber FC2 from above. The air flowing in via the air supply holes 713a to 715a and 723a to 725a is also heated by the combustion in the combustion chamber FC2 while passing through the air flow channel pipes 76a, 76b, 77a, and 77b and the sidewalls 71 and 72.

The control box CB houses a fuel cell system control unit therein. An operation device, a display device, and an alarming device are provided in the control box CB.

The carbon monoxide detector COD is a detector for detecting CO in an exhaust gas originally discharged to the outside through an exhaust gas passage or the like leaks to an outer housing that covers the fuel cell module FCM and the auxiliary device unit ADU. The combustible gas detector GD1 is a detector for detecting gas leakage and is provided in the fuel cell module FCM and the auxiliary device unit ADU.

The auxiliary device unit ADU is a unit including an auxiliary device for supplying water, a reforming target gas, and the air to the fuel cell module FCM. The auxiliary device unit ADU includes flow rate adjusting units AP1a and AP1b including an air blower as an air supplying unit and a flow rate adjusting valve and the like, an electromagnetic valve AP2, a flow rate adjusting unit FP1 including a fuel pump as a fuel supplying unit and a flow rate adjusting valve and the like, desulfurizer FP2, gas shut-off valves FP4 and FP5, a flow rate adjusting unit WP1 including a water pump as a water supplying unit and a flow rate adjusting valve and the like, and a combustible gas detector GD2.

The air supplied from an external air supply source is not supplied to the flow rate adjusting units AP1a and AP1b if the electromagnetic valve AP2 is closed. The air is supplied to the flow rate adjusting units AP1a and AP1b if the electromagnetic valve AP2 is open. The air subjected to flow rate adjustment by the flow rate adjusting unit AP1a is heated by a heater AH1 as reforming air and supplied to a mixing unit MV for mixing with the reforming target gas. The air subjected to the flow rate adjustment by the flow rate adjusting unit AP1b is heated by a heater AH2 as power generation air and supplied to the power generation chamber FC1 of the fuel cell module FCM. The power generation air supplied to the power generation chamber FC1 is supplied to the air electrodes of the single cells 4.

Inflow of the utility gas supplied from an external fuel supply source is controlled by the gas shut-off valves FP4 and FP5 as a dual electromagnetic valve. If both the gas shut-off valves FP4 and FP5 are open, the utility gas is supplied to the desulfurizer FP2. If one of the gas shut-off valves FP4 and FP5 is closed, the utility gas is shut off. The utility gas supplied to the desulfurizer FP2 changes to the reforming target gas with a sulfur component removed and is supplied to the flow rate adjusting unit FP 1. The reforming target gas subjected to the flow rate adjustment by the flow rate adjusting unit FP1 is supplied to the mixing unit MV for mixing with the reforming air. The reforming target gas and the reforming air mixed by the mixing unit MV are supplied to the reformer RF of the fuel cell module FCM.

The tap water supplied from an external water supply source is changed to pure water and stored in the water storage tank WP2. The pure water stored in the water storage tank WP2 is supplied to the reformer RF of the fuel cell module FCM with a flow rate adjusted by the flow rate adjusting unit WP1.

The combustible gas detector GD2 is a sensor for detecting whether gas leakage occurs in the gas shut-off valves FP5 and FP4, the desulfurizer FP2, and the flow rate adjusting unit FP1, which for a system as a fuel supply unit, and so-called raw gas is discharged to the outside.

A control configuration of the fuel cell system FCS having the fuel cell FC according to this embodiment is explained below. FIG. 6 is a block diagram showing the control configuration of the fuel cell system FCS. As shown in FIG. 6, the fuel cell system FCS includes the fuel cell module FCM, an air supply unit AP that supplies the air to the fuel cell module FCM, a fuel supplying unit FP that supplies the reforming target gas as a fuel gas to the fuel cell module FCM, a water supplying unit WP that supplies water to the fuel cell module FCM, and a power extracting unit EP that extracts electric power from the fuel cell module FCM. The air supplying unit AP, the fuel supplying unit FP, the water supplying unit WP, and the power extracting unit EP are housed in the auxiliary device unit ADU.

The fuel cell module FCM, the air supplying unit AP, the fuel supplying unit FP, the water supplying unit WP, and the power extracting unit EP are controlled on the basis of a control signal output from the fuel cell system control unit CS. The fuel cell system control unit CS includes a CPU, memories such as a ROM and a RAM and an interface for exchanging a control signal and a sensor signal. An operation device CS1, a display device CS2, and an alarming device CS3 are attached to the fuel cell system control unit CS. An operation instruction signal input from the operation device CS1 is output to the fuel cell system control unit CS. The fuel cell system control unit CS controls the fuel cell module FCM and the like on the basis of the operation instruction signal. Information controlled by the fuel cell system control unit CS and predetermined warning information are output to the display device CS2 and the alarming device CS3. The fuel cell system control unit CS is housed in the control box CB. The operation device CS1, the display device CS2, and the alarming device CS3 are housed in a not-shown box.

Sensor signals are output to the fuel cell system control unit CS from sensors provided in various places of the fuel cell system FCS. As the sensors that output signals to the fuel cell system control unit CS, a reformer temperature sensor DS1, a stack temperature sensor DS2, an exhaust temperature sensor DS3, a reformer inner pressure sensor DS4, a water level sensor DS5, a water flow rate sensor DS6, a fuel flow rate sensor DS7, a reforming air flow rate sensor DS8, a power generation air flow sensor DS9, a power state detecting unit DS10, a hot water storage state detection sensor DS11, a carbon monoxide detection sensor DS12, and a combustible gas detection sensor DS13 are provided.

The reformer temperature sensor DS1 is a sensor for measuring the temperature of the reformer RF. In the case of this embodiment, two reformer temperature sensors are provided. The stack temperature sensor DS2 is a sensor for measuring the temperature of the single cells 4 arranged in the power generation chamber FC1. The stack temperature sensor DS2 is arranged near a cell stack including the plural single cells 4. The exhaust temperature sensor DS3 is a sensor for measuring the temperature of an exhaust gas discharged from the combustion chamber FC2. The exhaust temperature sensor DS3 is arranged in a path reaching the hot water producing device HW from the combustion chamber FC2 passing through near the reformer RF. The reformer inner pressure sensor DS4 is a sensor for measuring the pressure in the reformer RF.

The water level sensor DS5 is a sensor for measuring the water level of the water storage tank WP2. In the case of this embodiment, four water level sensors are provided. The water flow rate sensor DS6 is a sensor for measuring a flow rate of the pure water supplied from the auxiliary device unit ADU to the fuel cell module FCM. The fuel flow rate sensor DS7 is a sensor for measuring a flow rate of the reforming target gas supplied from the auxiliary device unit ADU to the fuel cell module FCM. The reforming air flow rate sensor DS8 is a sensor for measuring a flow rate of the reforming air supplied from the auxiliary device unit ADU to the reformer RF of the fuel cell module FCM. The power generation air flow rate sensor DS9 is a sensor for measuring a flow rate of the power generation air supplied from the auxiliary device unit ADU to the fuel cell module FCM.

The power state detecting unit DS10 is an aggregate of sensing means and is a section that detects a state of generated power extracted from the fuel cell module FCM. The hot water storage state detection sensor DS11 is an aggregate of sensing means and is a section that detects a hot water storage state of the hot water producing device HW.

The carbon monoxide detection sensor DS12 is a sensor included in the carbon monoxide detector COD and is a sensor that detects leakage of carbon monoxide in the fuel cell module FCM to the inside of the housing. The combustible gas detection sensor DS13 is a sensor included in the combustible gas detectors GD1 and GD2 and is a sensor that detects leakage of the combustible gas in the fuel cell module FCM and the auxiliary device unit ADU.

Switching of various reforming reactions during the start (a start mode) of the fuel cell system FCS is explained below with reference to FIG. 7. FIG. 7 is a graph showing temperatures of the units and control voltages of the units during the start of the fuel cell system FCS.

In the start mode of the fuel cell system FCS in this embodiment, reforming reactions are proceeded while combustion operation, a partial oxidation reforming reaction (POX), a first auto-thermal reforming reaction (ATR1), a second auto-thermal reforming reaction (ATR2), and a steam reforming reaction (SR) are sequentially switched.

The partial oxidation reforming reaction (POX) is a reforming reaction performed by supplying the reforming target gas and the air to the reformer RF. A reaction indicated by Reaction Formula (1) progresses.

$$C_mH_n + xO_2 \rightarrow aCO_2 + bCO + cH_2 \quad (1)$$

Since the partial oxidation reforming reaction (POX) is a exothermic reaction, startability is high. The partial oxidation reforming reaction (POX) is a reforming reaction suitable in the beginning of start of the fuel cell system FCS. However, in the partial oxidation reforming reaction (POX), hydrogen yield is theoretically low and it is difficult to control the exothermic reaction. The partial oxidation reforming reaction (POX) is a reforming reaction desirably used only in the beginning of start when heat supply to the fuel cell module FCM is necessary. When attention is paid to only the partial oxidation reforming reaction (POX), space velocity is set high. Therefore, for example, when the reformer RF is dividedly formed and a reformer exclusively used for the partial oxidation reforming reaction (POX) is provided, the exclusive reformer can be reduced in size.

The steam reforming reaction (SR) is a reforming reaction performed by supplying the reforming target gas and steam to the reformer RF. A reaction indicated by Reaction Formula (2) progresses.

$$C_mH_n + xH_2O \rightarrow aCO_2 + bCO + cH_2 \quad (2)$$

The steam reforming reaction (SR) is a reaction with highest hydrogen yield and high efficiency. However, since the steam reforming reaction (SR) is an endothermic reaction, a heat source is necessary. The steam reforming reaction (SR) is a reaction suitably used at a state when temperature rises to some degree from the beginning of start of the fuel cell system FCS. When attention is paid to only the steam reforming reaction (SR), since the space velocity is set low, the reformer RF tends to be increased in size.

The first auto-thermal reforming reaction (ATR) including the first auto-thermal reforming reaction (ATR1) and the second auto thermal reforming reaction (ATR2) is a reforming reaction in which both the partial oxidation reforming reaction (POX) and the steam reforming reaction (SR) are used. The auto-thermal reforming reaction (ATR) is a reforming reaction performed by supplying the reforming target gas, the air, and steam to the reformer RF. A reaction indicated by Reaction Formula (3) progresses.

$$C_mH_n + xO_2 + yH_2O \rightarrow aCO_2 + bCO + cH_2 \quad (3)$$

In the auto-thermal reforming reaction (ATR), hydrogen yield is intermediate yield between the hydrogen yield of the partial oxidation reforming reaction (POX) and the hydrogen yield of the steam reforming reaction (SR) and balance of reaction heat can be easily kept. The auto-thermal reforming reaction (ATR) is a reforming reaction suitable as a reaction for linking the partial oxidation reforming reaction (POX) and the steam reforming reaction (SR). In the case of this embodiment, a small amount of water is supplied and the first auto-thermal reforming reaction (ATR1) closer to the partial oxidation reforming reaction (POX) is performed first. After temperature rises, water is supplied to be increased and the second auto-thermal reforming reaction (ATR2) closer to the steam reforming reaction (SR) is performed later.

The start mode of the fuel cell system FCS is explained below. In FIG. 7, elapsed time after start is plotted on the abscissa and temperatures of the units are plotted on the left ordinate. Since voltages are control voltages, no specific scale is marked for the voltage. Various voltages and temperatures are shown as rising (a supply amount increases) upward in the figure.

First, the flow rate adjusting unit AP1a, the electromagnetic valve AP2, the heater AH1, and the mixing unit MV are controlled to increase the reforming air and the air is supplied to the reformer RF. The flow rate adjusting unit FP1, the gas shut-off valves FP4 and FP5, and the mixing unit MV are controlled to increase the supply of the reforming target gas and the gas is supplied to the reformer RF. In this way, the air and the reforming target gas are supplied and ignited by the ignition device via the ignition device insertion hole 724 to execute combustion operation. At this point, as explained above, the power generation air is supplied to the power generation chamber FC1 from the air supply holes 713a to 715a and 723a to 725a.

As shown in FIGS. 4 and 5, first, a part of the air jetted from the air supply holes 713a (723a) directly hits to brush against the lower parts of the single cells 4 (the single cells 4a shown in FIG. 5) disposed in a position closest to the sidewall 71 (72) in the cell stack 30. The remaining portion of the air jetted from the air supply holes 713a (723a) (a portion not brushing against the lower parts of the single cells 4) flows to the inner part along the rows of the single cells 4 (the linear cell groups) arrayed along the arrow B direction shown in FIG. 2. At this point, as shown in FIG. 5, a part of the air flowing to the inner part from the single cells 4a caused by brushing the lower parts of the single cells 4 brushes against the lower parts of the single cells 4 (single cells 4b shown in FIG. 5) disposed in the inner part next to the single cells 4a. As shown in FIG. 5, the remaining air not brushing against the lower parts of the single cells 4b further flows to the inner part along the rows of the single cells 4 (the linear cell groups). A part of the air brushes against the lower parts of the single cells 4 (single cells 4c shown in FIG. 5) disposed in the inner part next to the single cells 4b. Further, the remaining air is sequentially divided in to a portion brushing against the single cells and a portion not brushing against the single cells and caused to reach the inner part in the same manner. Therefore, the air can be equally and efficiently supplied to the single cells 4 disposed near the sidewall 71 (72) and the single cells 4 disposed in a position apart from the sidewall 71 (72) (a position on the inner side along the rows of the single cells). The air jetted from the air supply holes 713a and 723a changes to an ascending current and is equally supplied from the lower parts to the upper parts of the single cells 4.

The air jetted from the air supply holes 714a and 724a flows to the inner part in the spaces $S_1$ and $S_2$ at velocity higher than that of the air jetted from the air supply holes 713a and 723a. In the same manner as the supply of the air to the other regions, the air can be supplied to the spaces $S_1$ and $S_2$ where air insufficiency tends to occur. Therefore, in the same manner as the supply of the air to the other single cells 4, the air can be equally supplied to, in the cell stack 30, the single cells 4 forming the rows closest to the sidewalls 78 and 79 where air insufficiency tends to occur. The air jetted from the position equivalent to the lower parts of the single cells 4 changes to an ascending current and is equally supplied from the lower parts to the upper parts of the single cells 4. On the other hand, the air jetted from the position equivalent to the upper parts of the single cells 4 quickly reaches the upper parts of the spaces $S_1$ and $S_2$ where air insufficiency tends to occur, supplements the air insufficiency, and plays a role of equally supplying the air to the cell stack 30.

The air jetted from the air supply holes 715*a* and 725*a* directly hits the single cells 4 disposed in the position closest to the sidewall 71 (72) in the rows closest to the sidewalls 78 and 79 in the cell stack 30. Therefore, the air can be efficiently and equally supplied to, in the cell stack 30, the row closest to the sidewalls 78 and 79, the regions where air insufficiency tends to occur.

The air supply holes 714*a*, 724*a*, 715*a*, and 725*a* have a diameter smaller than that of the air supply holes 713*a* and 723*a*. The air supply holes 714*a*, 724*a*, 715*a*, and 725*a* have an opening area smaller than that of the air supply holes 713*a* and 723*a*. The air supply holes 714*a*, 724*a*, 715*a*, and 725*a* have an amount of the air jetted therefrom than that of the air supply holes 713*a* and 723*a*. Since the four air supply holes 714*a*, the four air supply holes 724*a*, the four air supply holes 715*a*, and the four air supply holes 725*a*, each of which has a small diameter, are provided in the positions corresponding to the regions and the spaces where air insufficiency tends to occur, an amount of the air supplied to the regions and the spaces can be secured.

In this way, the power generation air is equally supplied to the respective single cells 4 housed in the power generation chamber FC1 and is also equally supplied in the up to down direction of the respective single cells 4. Therefore, excellent power generation performance can be shown. The power generation air is also equally supplied in partial oxidation reforming reaction operation (POX operation), the first auto-thermal reforming reaction (ATR1), the second auto-thermal reforming reaction (ATR2), and the steam reforming reaction (SR), as explained in detail later.

The execution of the combustion operation may be performed by raising the temperature of the combustion chamber FC2 and naturally igniting the air and the reforming target gas. In the combustion chamber FC2 above the power generation chamber FC1, the fuel gas passing through the reformer RF and the power generation air are mixed and burned. The temperature of the combustion chamber FC2 gradually rises.

Subsequently, when the temperature of the reformer RF rises to about 300° C., the partial oxidation reforming reaction (POX) progresses. Since the partial oxidation reforming reaction (POX) is a exothermic reaction, the temperatures of the units rise. When a predetermined time elapses after the partial oxidation reforming reaction (POX) is started, a supply amount of the reforming air is further increased to further advance the partial oxidation reforming reaction (POX).

Subsequently, on condition that the temperature of the reformer RF rises to be equal to or higher than about 600° C. and the temperature of the cell stack 30 exceeds about 250° C., the reforming reaction is shifted to the first auto-thermal reforming reaction (ATR1). In the first auto-thermal reforming reaction (ATR1), the flow rate of the reforming air supplied to the reformer RF is reduced and the flow rate of the reforming target gas supplied to the reformer RF is maintained. An extremely small amount of pure water is supplied to the reformer RF. The auto-thermal reforming reaction (ATR) is a reaction in which the partial oxidation reforming reaction (POX) and the steam reforming reaction (SR) are mixed. Since internal balance can be thermally kept, the reaction advances thermally independently in the reformer RF. The first auto-thermal reforming reaction (ATR1) is a reaction close to the partial oxidation reforming reaction (POX), an amount of the air is relatively large and is a reaction in which heat generation is dominant.

Subsequently, on condition that the temperature of the reformer RF rises to be equal to or higher than 600° C. and the temperature of the cell stack 30 exceeds about 400° C., the reforming reaction is shifted to the second auto-thermal reforming reaction (ATR2). In the second auto-thermal reforming reaction (ATR2), the flow rate of the reforming air supplied to the reformer RF is reduced and the flow rate of the reforming target gas supplied to the reformer RF is also reduced. A small amount of pure water is supplied to the reformer RF. The second auto-thermal reforming reaction (ATR2) is a reaction close to the steam reforming reaction (SR), an amount of the air is relatively small and an amount of water is large and is a reaction in which heat absorption is dominant. However, since the temperature in the power generation chamber FC1 exceeds about 400° C., a large temperature fall is not caused even if an endothermic reaction is dominant.

Subsequently, on condition that the temperature of the reformer RF rises to be equal to or higher than 650° C. and the temperature of the cell stack 30 exceeds about 600° C., the reforming reaction is shifted to the steam reforming reaction (SR). In the steam reforming reaction (SR), the reforming air supplied to the reformer RF is shut off and the flow rate of the reforming target gas supplied to reformer RF is reduced. The predetermined amount of pure water is supplied to reformer RF. Since the steam reforming reaction (SR) is an endothermic reaction, the reaction advances while keeping heat balance by combustion heat from the combustion chamber FC2. Since this stage is already a final stage of start, the inside of the power generation chamber FC1 is heated to sufficiently high temperature. Therefore, even if the endothermic reaction is mainly performed, a substantial temperature fall is not caused. Even if the steam reforming reaction (SR) advances, a combustion reaction continues in the combustion chamber FC2.

As explained above, when a reforming process is switched from the ignition according to the transition of the temperature, the temperature in the power generation chamber FC1 gradually rises. When the temperature of the power generation chamber FC1 reaches predetermined power generation temperature lower than rated temperature (about 700° C.) for stably actuating the fuel cell module FCM, an electric circuit including the fuel cell module FCM is closed. Consequently, the fuel cell module FCM starts power generation. Electric current flows to the circuit and electric power can be supplied to the outside. According to the power generation of the single cells 4, the single cells 4 themselves also generate heat and the temperature of the single cells 4 rises. As a result, the temperature reaches rated temperature for actuating the fuel cell module FCM, for example, 700 to 800° C.

Thereafter, in order to maintain the rated temperature, a combustion gas and the air larger in amounts than amounts of a combustion gas and the air consumed by the single cells 4 are supplied to continue the combustion in the combustion chamber FC2. During the power generation, the power generation advances in the stem reforming reaction (SR) with high reforming efficiency. Strictly speaking, the steam reforming reaction (SR) itself is performed at about 400° C. to 800° C. However, in a combination with the single cells 4, the steam reforming reaction (SR) advances at about 500° C. to 700° C.

Figure 8:
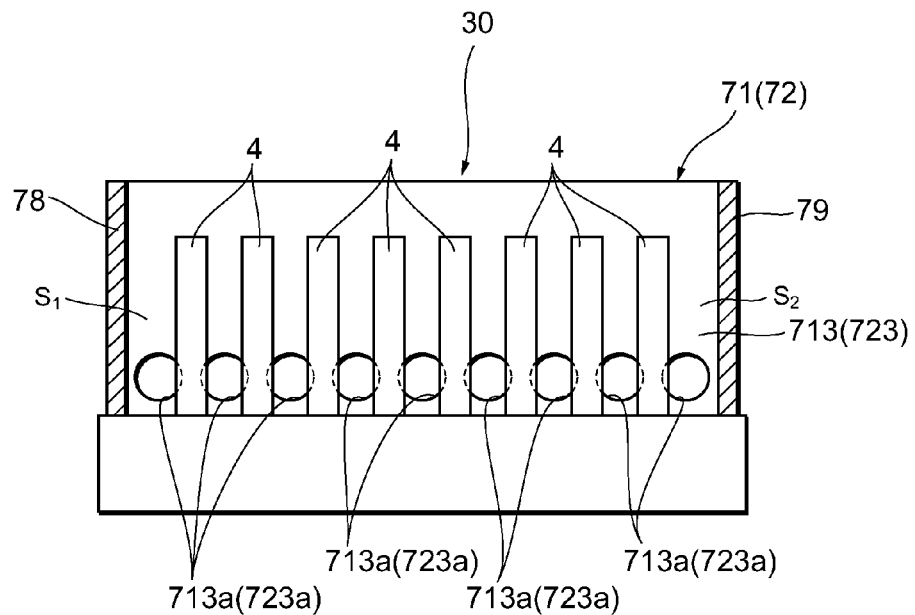
FIG. 8 is a sectional schematic view schematically showing a part of a fuel cell according to another embodiment of the present invention.

In this embodiment, the air supply holes 713*a* to 715*a* are formed in the sidewall 71 and the air supply holes 723*a* to 725*a* are formed in the sidewall 72. A manner of formation of air supply holes is not limited to this. For example, as shown in FIG. 8, it is also possible that the air supply holes 714*a*, 715*a*, 724*a*, and 725*a* are not formed and only the air supply holes 713a and 723a are respectively formed in the sidewalls 71 and 72. In the case of this configuration, for supplying the air to the entire cell stack 30 equally, it is desirable to form the air supply holes 713a in a position where the air brushes against the single cells 4 arrayed on the space $S_1$ side when the air supply holes 713a is projected in the direction in which the air is jetted, and a portion not brushing against the single cells 4 is jetted to the space $S_1$, and in a position where the air brushes against the single cells 4 arrayed on the space $S_2$ side when the air supply holes 713a is projected in the direction in which the air is jetted and a portion not brushing against the single cells 4 is jetted to the space $S_2$.

Figure 9:
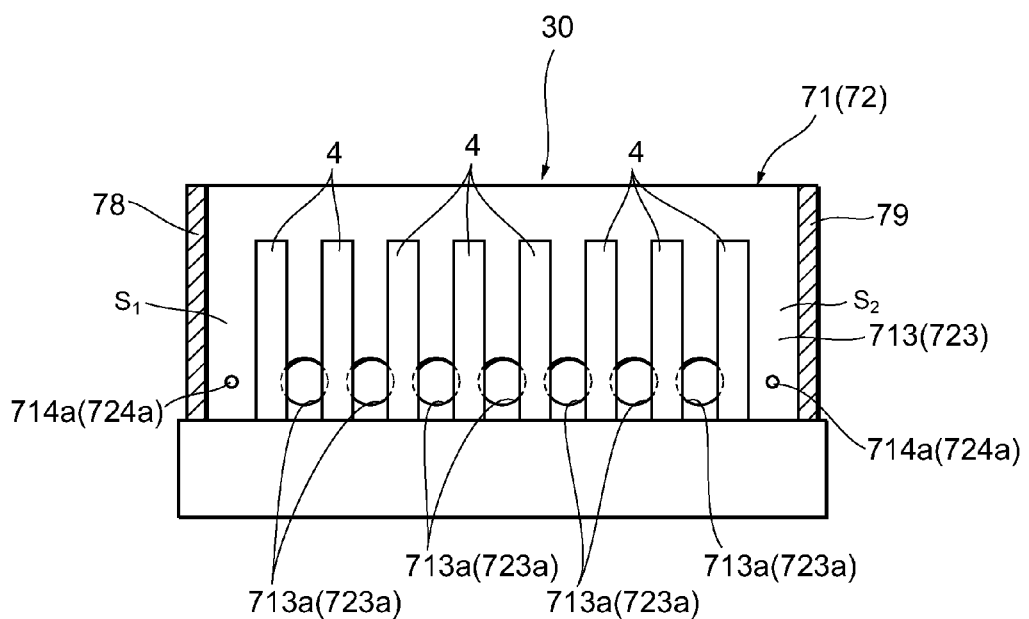
FIG. 9 is a sectional schematic view schematically showing a part of a fuel cell according to still another embodiment of the present invention.

As another embodiment of the present invention, for example, as shown in FIG. 9, it is also possible that, in the sidewall 71, the air supply holes 713a shown in FIG. 4 is formed and the air supply holes 714a are formed in the position equivalent to the lower parts of the single cells 4. The sidewall 72 has the same configuration.

Figure 10:
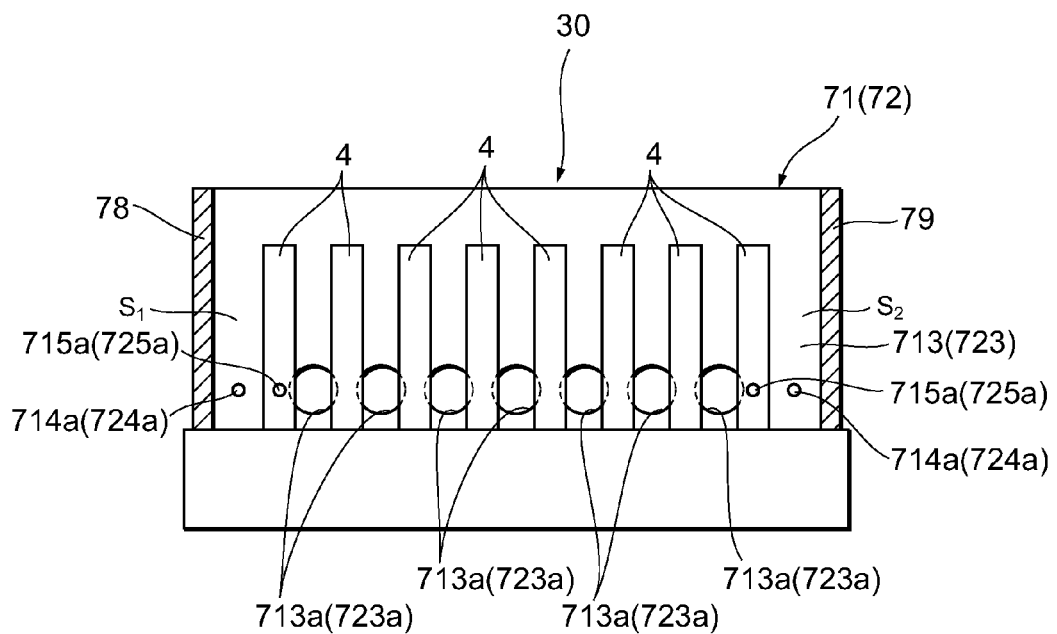
FIG. 10 is a sectional schematic view schematically showing a part of a fuel cell according to still another embodiment of the present invention.

As still another embodiment of the present invention, for example as shown in FIG. 10, it is also possible that, in the sidewall 71, the air supply holes 713a and 714a shown in FIG. 9 are formed and the air supply holes 715a are formed in the position equivalent to the lower parts of the single cells 4. The sidewall 72 has the same configuration.

Figure 11:
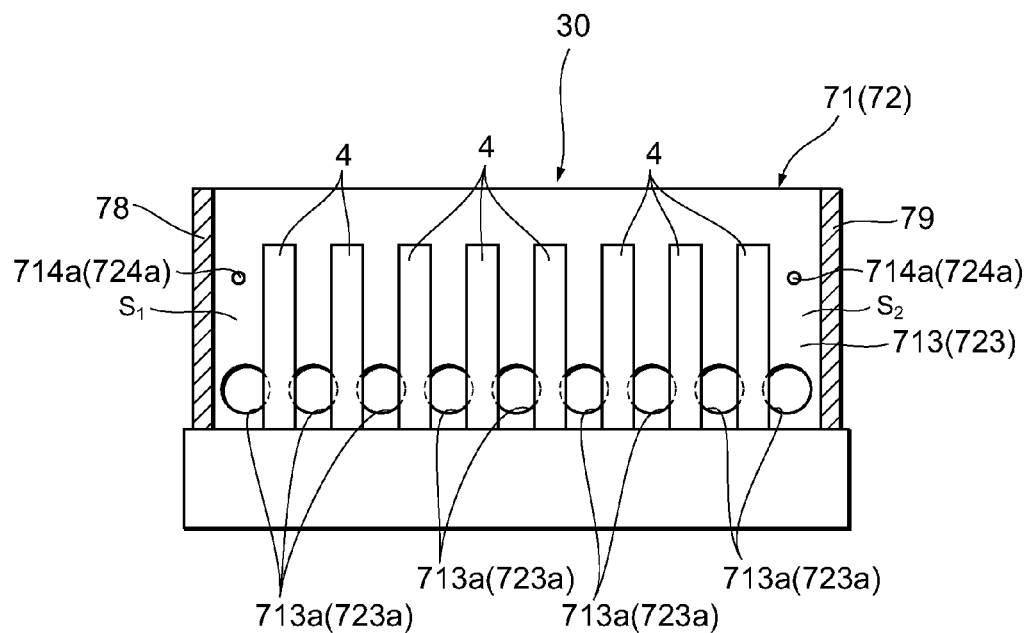
FIG. 11 is a sectional schematic view schematically showing a part of a fuel cell according to still another embodiment of the present invention.

As still another embodiment of the present invention, for example, as shown in FIG. 11, it is also possible that, in the sidewall 71, the air supply holes 713a shown in FIG. 8 are provided and the air supply holes 714a are provided in the position equivalent to the upper parts of the single cells 4. The sidewall 72 has the same configuration.

Figure 12:
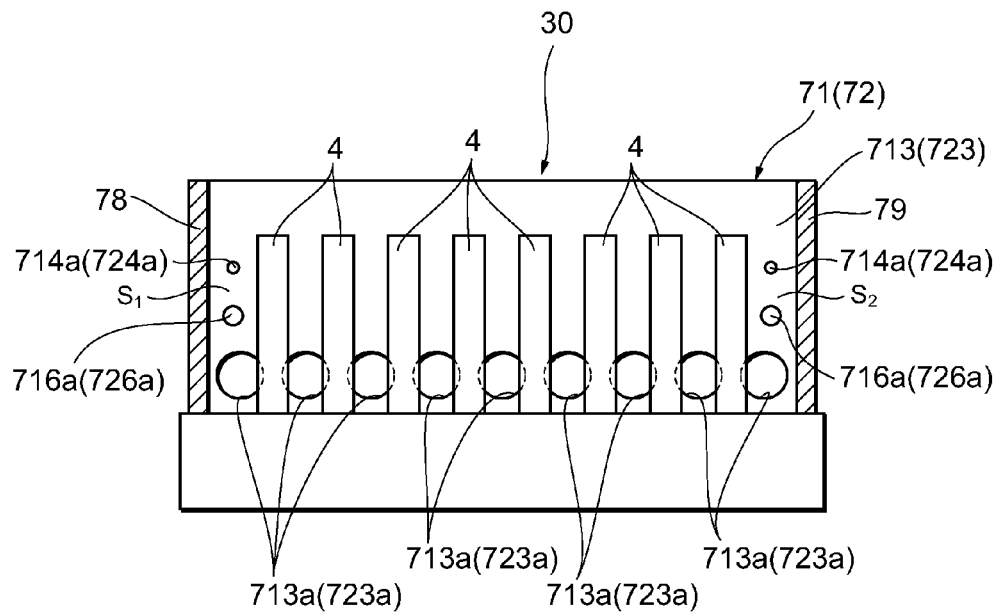
FIG. 12 is a sectional schematic view schematically showing a part of a fuel cell according to still another embodiment of the present invention.

Further, as still another embodiment of the present invention, for example, as shown in FIG. 12, it is also possible that, in the sidewall 71, the air supply holes 713a and 714a shown in FIG. 11 are formed and air supply holes 716a are formed in the position opposed to the spaces $S_1$ and $S_2$ and equivalent to the centers of the single cells 4. As shown in FIG. 12, the air supply holes 716a have a diameter smaller than that of the air supply holes 713a and larger than that of the air supply holes 714a. The air supply holes 716a have an opening area smaller than that of the air supply holes 713a and larger than that of the air supply holes 714a. Air supply holes 726a same as the air supply holes 716a may be formed in the sidewall 72. In this way, in addition to the configuration shown in FIG. 11, the air supply holes 716a are additionally formed in the sidewall 71 (the air supply holes 726a are formed in the sidewall 72). This makes it possible to jet the air to the position equivalent to the center of the single cells 4 in the spaces $S_1$ and $S_2$. Therefore, the air can also be supplied to, in the cell stack 30, the centers of the single cells forming the rows closest to the sidewalls 78 and 79 where air insufficiency tends to occur. The air can be equally and efficiently supplied to the entire cell stack 30. Diameters of air supply cells are set smaller in the air supply holes disposed in higher parts. Opening areas of the air supply holes are set smaller in the air supply holes disposed in the higher parts. With such a configuration, the air with a higher velocity of flow is supplied in the higher parts. Therefore, it is possible to cause the air to surely reach the upper parts of the spaces $S_1$ and $S_2$ where air insufficiency particularly occurs. Therefore, it is possible to equally and more efficiently supply the air irrespectively of a disposed position of the single cells 4.

Figure 13:
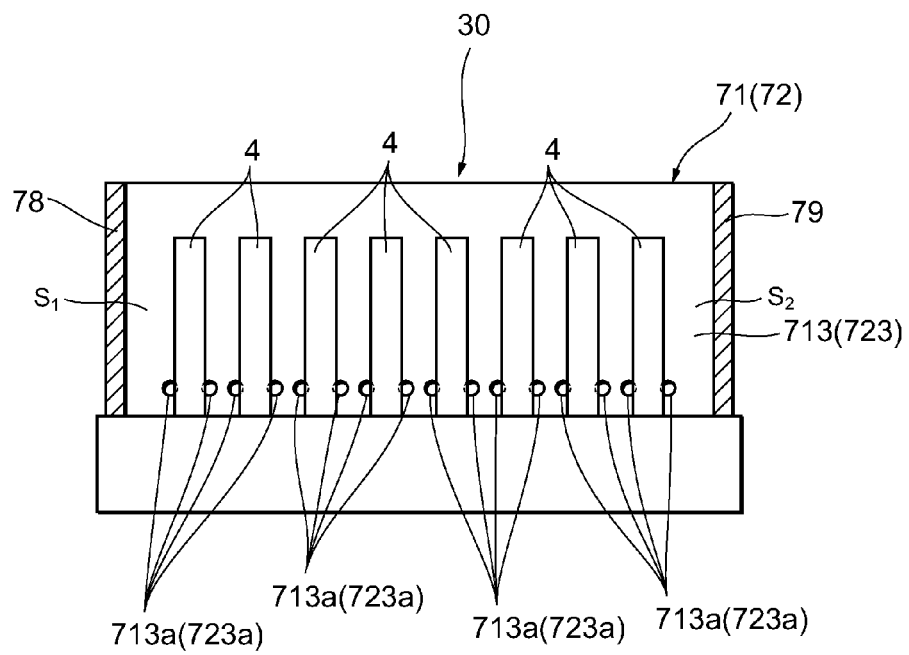
FIG. 13 is a sectional schematic view schematically showing a part of a fuel cell according to still another embodiment of the present invention.

In this embodiment, the air supply holes 713a and 723a having the shape extending across the two single cells 4 adjacent to each other in the arrow A direction shown in FIG. 2. However, a manner of air supply holes is not limited to this and other manners can be adopted. For example, as shown in FIG. 13, when the air supply holes 713a (723a) are projected in the direction perpendicular to the wall surface 713 (the direction in which the air is jetted), the air supply holes 713a (723a) may be formed in a shape (a size) having a portion where the air jetted from the air supply holes 713a (723a) brushes against the single cells 4 in one row and a portion where the air does not brush against the single cells 4. In the case of this configuration, an opening area of the air supply holes 713a (723a) is smaller than that in this embodiment. Therefore, for the purpose of securing a supply amount of the air jetted from the air supply holes 713a (723a), it is also desirable to increase the number of air supply holes 713a (723a) to be formed. Specifically, the number of air supply holes 713a (723a) to be formed may be increased by, for example, forming the air supply holes 713a (723a) having, on one side (the right side on FIG. 13) of the single cells 4 in one row, the portion where the air brushes against the single cells 4, and the air supply holes 713a (723a) having, in the other side (the left side on FIG. 13) of the single cells 4 in one row, the portion where the air brushes against the single cells 4.

In this embodiment the sidewalls 71 and 72 are disposed in the fuel cell module FCM and the air supply holes are formed in the sidewalls 71 and 72. However, the formation of the air supply hole is not limited to this. The air supply holes may be formed only in one of the wall surfaces 713 and 723 as desired. In this case, the sidewall in which the air supply holes are not formed does not have to be disposed.

In this embodiment, the sidewalls 71 and 72 having the double wall structure are disposed. However, the sidewalls are not limited to this. The sidewalls 71 and 72 may have other configurations as long as the sidewalls 71 and 72 have wall surfaces in which air supply holes can be formed and can supply the air into the power generation chamber FC1 without leaking the air to an unnecessary area. For example, it is also possible that a sidewall forming a closed space between the sidewall and the cover member 100 is provided in the cover member 100 and the air supplied to the closed space is jetted from air supply holes formed in the sidewall.

Figure 14:
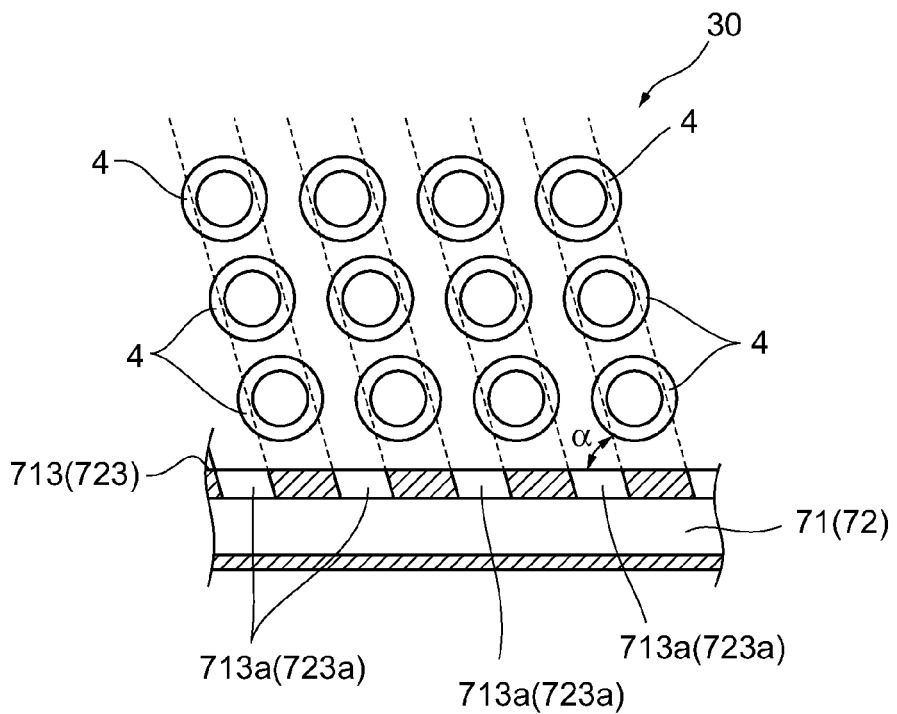
FIG. 14 is a sectional schematic view schematically showing a part of a fuel cell according to still another embodiment of the present invention.
Figure 15:
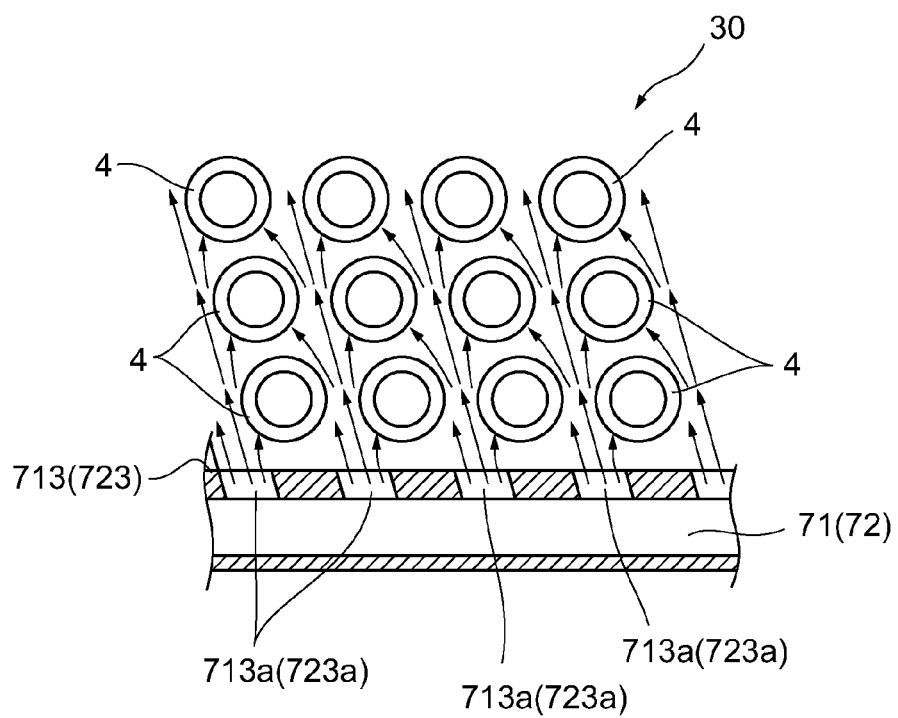
FIG. 15 is a plan schematic view schematically showing a part of a flow of the air supplied to a fuel cell shown in FIG. 14.

In this embodiment, the air supply holes are formed such that the air is jetted in the direction perpendicular to the wall surfaces 713 and 723 (the direction parallel to the sidewalls 78 and 79). However, the formation of the air supply holes is not limited to this. For example, as shown in FIG. 14, the inner walls defining the air supply holes 713a may be formed obliquely to the wall surface 713 such that the air jetted from the air supply holes 713a is jetted in an oblique direction (at an angle α shown in FIG. 14) with respect to the wall surface 713 of the sidewall 71 of the air flow channel. In this case, the respective single cells 4 are disposed in a line obliquely to the wall surface 713 along a jetting direction (lateral direction) of the air jetted from the air supply hole 713a. The air supply holes 713a are formed to have a portion where the air jetted from the air supply holes 713a brushes against the single cells 4 and a portion where the air does not brush against the single cells 4. In this configuration, as shown in FIG. 15, the air jetted from the air supply holes 713a flows obliquely to the wall surface 713 along the row direction of the single cells 4. An effect same as the effect in the form explained above can be obtained. The air supply holes 714a, 715a, 724a, and 725a may also be formed obliquely to the wall surface.

In this embodiment, the single cells 4 having the cylindrical shape are disposed. However, the shape of the single cells 4 is not limited to this and may be, for example, a flat shape.

What is claimed is:
1. A fuel cell that generates power when a fuel gas is supplied as a first reactive gas and an oxidant gas is supplied as a second reactive gas, or when the fuel gas is supplied as the second reactive gas and the oxidant gas is supplied as the first reactive gas, the fuel cell comprising:
- a cell stack in which a plurality of single cells are provided, inner flow channels for allowing the first reactive gas to pass are formed in the single cells, the single cells cause power generation reaction when the first reactive gas is allowed to pass through the inner flow channels provided along a vertical direction of the single cells from one lower end side of the single cells to an opposite upper end side of the single cells—and the second reactive gas is brought into contact with an outer circumferential portion of the single cells, the plurality of single cells are provided such that the plurality of single cells extend along the same vertical direction with one another, and a number of single cells are arranged in a lateral direction in a plurality of rows to form linear cell groups, wherein each of the plurality of single cells has a center line extending in the vertical direction; and
- a first sidewall in which a plurality of first holes for supplying the second reactive gas at a first flow velocity along the lateral direction, which is a direction in which the single cells included in the linear cell groups are arranged side by side in the plurality of rows, are formed such that only a first region, which is a part of a second-reactive-gas flow region projected in the lateral direction interferes with the single cells included in the linear cell groups and are formed such that a part of the second reactive gas supplied from the first holes brushes against front single cells in the linear cell groups, while a remaining part of the second reactive gas flows to the single cells in a back without brushing against the single cells, the first sidewall being provided on an outer side of the cell stack along a longitudinal direction, which is a direction in which the front single cells included in the linear cell groups are arranged;
- a second sidewall provided along the lateral direction on the outer side of the cell stack, the second sidewall includes two opposing sidewalls extending in the lateral direction;
- wherein a row of linear cell group is positioned adjacent to the second sidewall on the outer side of the cell stack to form an outer side linear cell group;
- a plurality of second holes are provided in the first sidewall for supplying the second reactive gas at a second flow velocity to a region between the second sidewall and the outer side linear cell group are formed to have a smaller opening area than an opening area of the first holes, wherein the second holes are formed such that a second region, which is another region excluding the first region from the second-reactive-gas-flow region projecting in the lateral direction does not interfere with the outer side linear cell group;
- wherein the plurality of first holes are formed such that the second-reactive-gas-flow region projected in the lateral direction does not interfere with the center lines of the plurality of single cells included in the linear cell groups; and
- the second flow velocity of the second reactive gas supplied from the plurality of second holes is higher than the first flow velocity of the second reactive gas supplied from the plurality of the first holes.

2. The fuel cell according to claim 1, wherein the first sidewall includes two opposing sidewalls arranged in the longitudinal direction, and each sidewall having the plurality of first holes, and the plurality of rows of the linear cell groups are disposed between the two opposing sidewalls of the first sidewall;

wherein, each of the plurality of first holes is positioned at a first height, which is in proximity to a height of the one lower end side of the single cells, a plurality of third holes are provided in the two opposing sidewalls of the first sidewall for supplying the second reactive gas to the outer side linear cell group, the plurality of third holes are aligned with the center line of the single cells in the outer side linear cell group so as to provide a flow of the second reactive gas in the lateral direction to interfere with the center line of the single cells in the outer side linear cell group.

3. The fuel cell according to claim 2, wherein the plurality of first holes are formed such that only a part of the region projected in the lateral direction of the liner cell groups interferes with the single cells included in the outer side liner cell group, wherein the plurality of third holes are positioned at a second height in proximity to the opposite upper side of the single cells, and the third holes are aligned along the center line of the single cells in the outer side linear cell group so as to provide the flow of the second reactive gas in the lateral direction to interfere with the center line of the single cells in the outer side linear cell group, the plurality of second holes are positioned at the second height, which is the same second height as that of the one third hole.

4. The fuel cell according to claim 2, wherein
the plurality of first holes for supplying the second reactive gas to the linear cell groups are formed in the opposing two sidewalls of the first sidewall such that only the first region projected in the lateral direction of the linear cell groups interferes with the single cells in the outer-side linear cell group, the third holes are formed in both opposing two sidewalls of the first sidewall to provide the flow of the second reactive gas in the lateral direction at the outer side linear cell group, the plurality of third holes include a pair of third holes with one third hole positioned at the same first height as that of the plurality of first holes, and another third hole disposed in proximity to the opposite upper end side of the single cells, the pair of third holes are aligned along the center line of the single cells in the outer side linear cell group so as to provide a flow of the second reactive gas in the lateral direction to interfere with the center line of the single cells in the outer side linear cell group, and the second holes are formed in both opposing two sidewalls of the first sidewall to provide a second-reactive-gas flow region projected in the lateral direction between the second wall and the outer side linear cell group, and the plurality of second holes include a pair of second holes with one second hole positioned at the same first height as that of the one third hole, and another second hole disposed at the same height as that of the another third hole.

5. The fuel cell according to claim 1, wherein the first sidewall includes two opposing sidewalls arranged in the longitudinal direction, and each sidewall having the plurality of first holes, and the plurality of rows of the linear cell groups are disposed between the two sidewalls of the first sidewall, wherein the plurality of first holes are also formed in a position to provide the second-reactive-gas flow to a region between the second sidewall and the outer side linear cell group, and the plurality of first holes are formed in a position such that only a part of the second-reactive-gas flow region projected in the lateral direction of the outer side linear cell group interferes with the single cells included in the outer side linear cell group, each of the plurality of first holes is positioned at a first height, which is in proximity to a height of the one lower end side of single cells, and the plurality of second holes are formed in between the outer side linear cell group and the second sidewall, wherein the plurality of second holes are positioned at a second height, which is in proximity to a height of the opposite upper end side of the single cells.

6. The fuel cell according to claim 5, further comprises fourth holes for supplying the second reactive gas to the region between the second sidewall and the outer side linear cell group, the fourth holes are positioned at a third height, which is middle height between the first height and the second height.

7. The fuel cell according to claim 6, wherein an opening area of the fourth holes is set smaller than the opening area of the first holes and larger than the opening areas of the second holes.

8. The fuel cell according to claim 1, wherein the first sidewall includes two opposing sidewalls arranged in the longitudinal direction, and each sidewall having the plurality of first holes, and the plurality of rows of the linear cell groups are disposed between the two sidewalls of the first sidewall;

each of the plurality of first holes is positioned at a first height, which is in proximity to a height of the one lower end side of single cells, wherein the plurality of first holes for supplying the second reactive gas to the linear cell groups are formed such that only a part of the second-reactive-gas flow region projected in the lateral direction of the linear cell groups interferes with the single cells included in the outer-side linear cell group, and the plurality of second holes are formed in the first sidewall and are positioned to provide a second-reactive-gas flow to a space between the outer side linear cell group and the second sidewall, the plurality of second holes include a pair of second holes having one second hole positioned at the same first height as that of the plurality of first holes and another second hole position at a second height, which is in proximity to a height of the opposite upper end side of the single cells.

* * * * *